(12) United States Patent
Jung et al.

(10) Patent No.: US 9,906,586 B2
(45) Date of Patent: Feb. 27, 2018

(54) METHOD AND DEVICE FOR TRANSMITTING DATA, AND METHOD AND DEVICE FOR RECEIVING DATA

(71) Applicant: SAMSUNG ELECTRONICS CO., LTD., Suwon-si (KR)

(72) Inventors: Jong-woo Jung, Suwon-si (KR); Sahng-hee Bahn, Yongin-si (KR); In-sik Myung, Incheon (KR); Jung-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 14/521,930

(22) Filed: Oct. 23, 2014

(65) Prior Publication Data

US 2015/0113432 A1 Apr. 23, 2015

(30) Foreign Application Priority Data

Oct. 23, 2013 (KR) .................. 10-2013-0126703

(51) Int. Cl.
*G06F 3/048* (2013.01)
*H04L 29/08* (2006.01)
(Continued)

(52) U.S. Cl.
CPC .......... *H04L 67/10* (2013.01); *G06F 3/04842* (2013.01); *G06F 3/04883* (2013.01);
(Continued)

(58) Field of Classification Search
CPC ............. G06F 3/04855; G06F 3/04883; G06F 3/04817; G06F 9/4856; G06F 9/4443
(Continued)

(56) References Cited

U.S. PATENT DOCUMENTS 5,949,414 A 9/1999 Namikata et al.
6,385,662 B1* 5/2002 Moon ................... G06F 9/4443
715/864

(Continued)

FOREIGN PATENT DOCUMENTS

EP 2493158 A1 8/2012
WO 2011059250 A2 5/2011

OTHER PUBLICATIONS

Search Report dated Jan. 26, 2015, issued by the International Searching Authority in counterpart International Application No. PCT/KR2014/009896.

(Continued)

*Primary Examiner* — Haoshian Shih
(74) *Attorney, Agent, or Firm* — Sughrue Mion, PLLC

(57) ABSTRACT

Methods and apparatuses for transmitting data to an external device are provided. The method includes establishing a communication link with the external device by using a first application, and displaying a first window that corresponds to the first application, in response to an execution request for a second application that is different from the first application, displaying a second window that corresponds to the second application as a background of the first window, receiving a sharing mode request via the first window, and in response to the sharing mode request, setting an operation mode of the device as a sharing mode, and transmitting data that is provided from the second application to the external device via the communication link.

20 Claims, 34 Drawing Sheets

(51) Int. Cl.
- *G06F 3/0484* (2013.01)
- *G06F 3/14* (2006.01)
- *G06F 3/0488* (2013.01)
- *H04M 1/725* (2006.01)

(52) U.S. Cl.
CPC ........ *G06F 3/1454* (2013.01); *H04M 1/7253* (2013.01); *G09G 2354/00* (2013.01); *H04M 2250/22* (2013.01)

(58) Field of Classification Search
USPC ................ 715/753, 830, 783, 752, 769, 864
See application file for complete search history.

(56) References Cited

U.S. PATENT DOCUMENTS

| | | | |
|---|---|---|---|
| 7,185,054 | B1 | 2/2007 | Ludwig et al. |
| 2004/0240434 | A1 | 12/2004 | Sato et al. |
| 2006/0075348 | A1 | 4/2006 | Xu et al. |
| 2006/0193448 | A1 | 8/2006 | Donoghue et al. |
| 2007/0115346 | A1 | 5/2007 | Kim et al. |
| 2008/0222688 | A1 | 9/2008 | Han |
| 2009/0111374 | A1 | 4/2009 | Lee |
| 2009/0228820 | A1* | 9/2009 | Kim ................... G06F 3/04817 715/769 |
| 2011/0029891 | A1* | 2/2011 | Kim ..................... G06F 9/4856 715/752 |
| 2011/0117941 | A1 | 5/2011 | Zhang |
| 2011/0191695 | A1 | 8/2011 | Dinka et al. |
| 2011/0265039 | A1* | 10/2011 | Lyon ................... G06F 3/04855 715/830 |
| 2012/0081556 | A1 | 4/2012 | Hwang et al. |
| 2013/0050263 | A1 | 2/2013 | Khoe et al. |
| 2013/0120447 | A1 | 5/2013 | Kim et al. |
| 2013/0132904 | A1* | 5/2013 | Primiani ............. G06F 3/04886 715/834 |
| 2013/0205219 | A1 | 8/2013 | Moha et al. |
| 2014/0365919 | A1* | 12/2014 | Shaw ................... H04L 12/1822 715/753 |
| 2015/0007100 | A1* | 1/2015 | Wang ................... G06F 3/04883 715/783 |

OTHER PUBLICATIONS

Written Opinion dated Jan. 26, 2015, issued by the International Searching Authority in counterpart International Application No. PCT/KR2014/009896.

Communication dated May 24, 2017, issued by the European Patent Office in counterpart European Patent Application No. 14855971.9.

* cited by examiner

METHOD AND DEVICE FOR TRANSMITTING DATA, AND METHOD AND DEVICE FOR RECEIVING DATA

CROSS-REFERENCE TO RELATED APPLICATION

This application claims priority from Korean Patent Application No. 10-2013-0126703, filed on Oct. 23, 2013 in the Korean Intellectual Property Office, the disclosure of which is incorporated herein in its entirety by reference.

BACKGROUND

1. Field

Apparatuses and methods consistent with exemplary embodiments relate to a method and device for transmitting and/or receiving data by using an application window having a predetermined size.

2. Description of Related Art

A mobile terminal may be configured to perform various functions. For example, the mobile terminal may perform a data and voice communication function, an image or moving picture capturing function by using a camera, a voice storage function, a music file reproduction function via a speaker system, or an image or video displaying function.

Some mobile terminals include additional functionality for playing a game, and some other mobile terminals are embodied as multimedia devices. Moreover, due to the rapid development of smart phones, creation and use of various applications has increased.

However, when a mobile terminal has a multi-window function, the multi-window function is provided on a small-sized screen so that only one or a limited number of applications running in the respective windows are executed. That is, due to a limit in the size of the screen of the mobile terminal, usability of the multi-window function is decreased.

SUMMARY

One or more exemplary embodiments of the present disclosure include a method and device for transmitting data to or receiving data from an external device by using an application window having a predetermined size, wherein a communication link is established between the device and the external device.

Additional aspects are set forth in part in the description which follows and, in part, will be apparent from the description, or may be learned by practice of the presented exemplary embodiments.

According to an aspect of an exemplary embodiment, there is provided a method of transmitting data to an external device, the method comprising establishing a communication link with the external device using a first application, displaying a first window corresponding to the first application and a second window corresponding to a second application, in response to receiving a sharing mode request via the first window, setting an operation mode of the device as a sharing mode, and transmitting data that is provided from the second application to the external device via the communication link.

The transmitted data may include at least one of content displayed on the second window, content selected in the second window, and content reproduced via the second application.

The content may include at least one of still image content, music content, moving picture content, text content, and webpage content.

The receiving of the sharing mode request may include receiving a user input of touching the first window over a predetermined time.

The setting of the operation mode may include displaying an indicator indicating the sharing mode on the first window.

The method may include in response to receiving a sharing mode cancel request via the first window, discontinuing the transmitting of the data to the external device.

The method may include in response to receiving a movement request, moving the first window.

The method may include, in response to receiving a synchronization mode request via the first window, setting an operation mode of the device as a synchronization mode, and transmitting control information to the external device via the communication link.

The method may include transmitting at least one of link information corresponding to a webpage displayed on the second window and position information of an icon displayed on the second window.

The method may include capturing an image of content that is displayed on the second window, and transmitting the captured image to the external device via the communication link.

The receiving of the synchronization mode request may include an input dragging the first window to a side portion of the screen.

The setting of the operation mode may include changing a shape of the first window to a bar shape, and displaying the bar-shaped first window on the side portion of the screen to indicate the synchronization mode.

The first application may include at least one of a call application, a messenger application, and a data transmission application, and the second application may include at least one of a camera application, a photo management application, a music reproduction application, a moving picture reproduction application, and a web browser.

The first window may have a predetermined size smaller than a size of a screen of the device, and the second window is displayed as a background of the first window.

The predetermined time may be two seconds.

According to another exemplary aspect, the exemplary method may be stored on a non-transitory computer-readable recording medium.

According to another exemplary embodiment, a device may include a communication unit configured to establish a communication link with the external device by using a first application, a display unit configured to display a first window that corresponds to the first application, and a second window that corresponds to a second application, a user input unit, and a controller configured to set an operation mode of the device as a sharing mode, in response to a sharing mode request received via the user input unit, and control the communication unit to transmit data provided from the second application via the communication link.

The user input unit may be configured to recognize a touch on the first window for more than a predetermined time as the sharing mode request.

The display unit may be configured to indicate the sharing mode on the first window.

The controller may discontinue transmitting the data in response to a sharing mode cancel request received via the user input unit.

The controller may be further configured to move the first window in response to a movement request received via the user input unit.

The controller may be further configured to set an operation mode of the device as a synchronization mode in response to a synchronization mode request received via the user input, and control the communication unit to transmit control information for controlling the external device to display content.

The control information may include at least one of displayed webpage link information and displayed icon position information.

The control information may include an image of content that is displayed on the second window.

The controller may be further configured to recognize an input, received via the user input unit, of dragging the first window to a side portion of the screen, as the synchronization mode request.

The controller may be further configured to change a shape of the first window to a bar shape, and display the bar-shaped first window on the side portion to indicate the synchronization mode.

According to another exemplary embodiment, there is provided a method of receiving data from an external device, the method comprising establishing a communication link with the external device using a first application, displaying a first window corresponding to the first application, receiving data from the external device via the communication link, displaying notice information indicating receipt of the data, executing a second application related to the received data, and providing the received data via the second application.

The method may include displaying the received data on a second window corresponding to the second application.

The method may include reproducing, by using the second application, received music content or moving picture content.

The method may include in response to receiving a synchronization mode request, setting an operation mode of the device as a synchronization mode in which link information of a webpage is received from the external device, and the webpage is displayed on the screen of the device by using the link information.

The method may include wherein the first window is displayed as a bar shape on a side portion of the screen to indicate the synchronization mode.

According to another exemplary embodiment, a device may include a communication unit configured to establish a communication link with an external device and receive data using a first application, a display unit configured to display a first window that corresponds to the first application, and notice information on the first window so as to indicate that the data is received, and a controller configured to execute a second application, related to the received data, in response to a touch input corresponding to the first window, and provide the received data using the second application.

According to another exemplary embodiment, a method may include sending data from a first device to a second device, the method including displaying, on the first device, a first window corresponding to a communication application in communication with the second device, and a second window corresponding to a second application, and transmitting data corresponding to information displayed in the second window, in response to receiving a predetermined input with respect to the first window, to the second device.

The method may include transmitting a selected content item displayed in the second window via the communication link in a sharing mode.

The method may include initiating the sharing mode over the communication link in response to a first touch-and-hold gesture on the first window, and the sharing mode is terminated in response to a second touch-and-hold gesture on the first window.

The method may include synchronously transmitting synchronous data corresponding to content displayed in the second window in a synchronization mode.

The method may include initiating the synchronization mode in response to an input dragging the first window of the first device to an edge of the first device, and the sharing mode is terminated in response to an input dragging the first window of the first device away from the edge of the first device.

The second application may be a web browser, and the synchronous data may be webpage link information.

The synchronous data further may include cursor location information.

The communication application may be a call application.

The second application may be a camera application, and the content item may be an image captured by the camera application.

The second application may be a music reproduction application, and the content item may be an audio file.

According to another exemplary embodiment, a device may include a communication unit configured to communicate with a second device via a communication application, a display unit configured to display a first window corresponding to a communication application, and a second window corresponding to a second application, an input unit, and a controller configured to control the communication unit to transmit data corresponding to information displayed in the second window, to the second device in response to receiving a predetermined input with respect to the first window.

The controller may be further configured to control the device so as to operate in a sharing mode, and transmit data corresponding to a selected content item displayed in the second window to the second device.

The controller may be configured to recognize a first touch-and-hold gesture on the first window as a sharing mode request, and recognize a second touch-and-hold gesture on the first window as a sharing mode termination request.

The controller may be configured to control the device so as to operate in a synchronization mode, and transmit synchronous data corresponding to content displayed in the second window.

The controller may be configured to recognize an input dragging the first window of the first device to an edge of the first device as a synchronization mode request, and recognize an input dragging the first window of the first device away from the edge of the first device as a sharing mode is termination request.

The second application may be a web browser, and the synchronous data may be webpage link information.

The synchronous data may include cursor location information.

The communication application may be a call application.

The second application may be a camera application, and the content item may be an image captured by the camera application.

The second application may be a music reproduction application, and the content item may be an audio file.

BRIEF DESCRIPTION OF THE DRAWINGS

These and/or other aspects will become apparent and more readily appreciated from the following description of the exemplary embodiments, taken in conjunction with the accompanying drawings in which:

FIG. 19 is a diagram illustrating an exemplary device synchronizing display of an icon with an external device in;

DETAILED DESCRIPTION OF EXEMPLARY EMBODIMENTS

Figure 1:
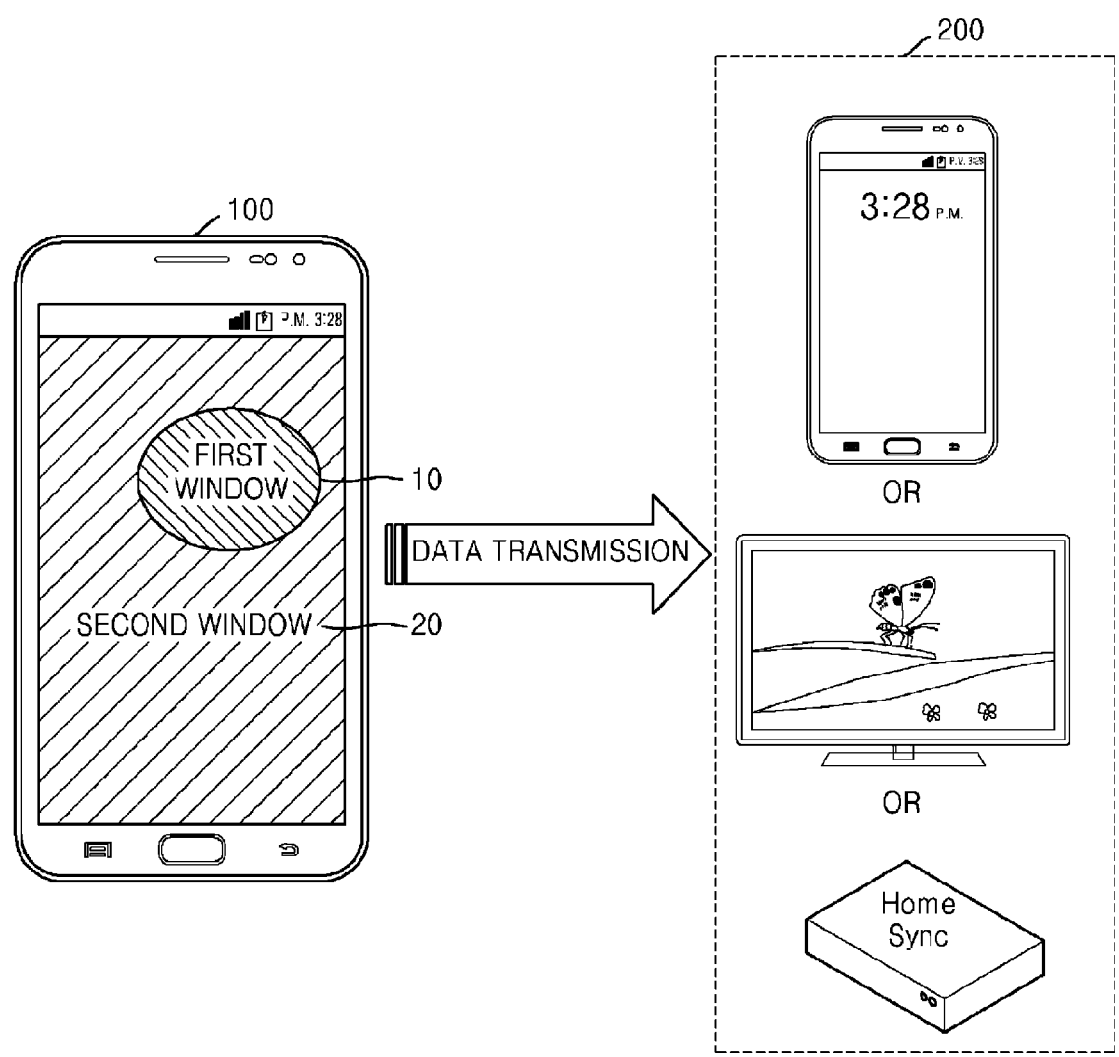
FIG. 1 is a diagram illustrating an exemplary data reception and transmission system.

Hereinafter, terms that are used in the specification will be briefly described, and exemplary embodiments will be described in detail. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Throughout the specification, the term "application" indicates a group of computer programs designed to perform a specific work. Throughout the specification, the application may vary. For example, the application may include, but is not limited to, a web browser, a camera application, a dictionary application, a translation application, a data transmission application, a music reproduction application, a moving picture reproduction application, a message application, a social communication application, a social media application, a map application, a photo management application, a broadcasting application, a game application, an exercise support application, a payment application, a memo application, a calendar application, or a phone book application.

One or more exemplary embodiments of the present disclosure will now be described more fully with reference to the accompanying drawings. However, the one or more exemplary embodiments of the present disclosure may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments of the present disclosure to those of ordinary skill in the art. In the following description, well-known functions or constructions are not described in detail since they would obscure the one or more exemplary embodiments of the present disclosure with unnecessary detail. Like reference numerals in the drawings denote like or similar elements throughout the specification.

As used herein, the term "and/or" includes any and all combinations of one or more of the associated listed items. Expressions such as "at least one of," when preceding a list of elements, should be understood to modify the entire list of elements and not as modifying the individual elements of the list.

FIG. 1 illustrates a data reception and transmission system according to an exemplary embodiment.

Referring to FIG. 1, the data reception and transmission system may include a transmitting device that transmits data, and a receiving device that receives data. For convenience of description, throughout the specification, the transmitting device that transmits the data is described as a first device 100, and the receiving device that receives the data is described as a second device 200.

In the present exemplary embodiment, the first device 100 may include at least one communication module for communicating with the second device 200. For example, the first device 100 may include, but is not limited to, a mobile communication module (e.g., 3G, 4G, or 5G), a short-range communication module (e.g., a Bluetooth communication module, a Bluetooth Low Energy (BLE) communication module, a Wi-Fi communication module, a ZigBee communication module, an infrared Data Association (IrDA) communication module, a Wi-Fi Direct (WFD) communication module, an ultra wideband (UWB) communication module, an Ant+ communication module, or a home network communication module.

The first device 100 may have a multi window function. Here, the multi window function may function as a user interface, displaying several work windows (e.g., an application execution window) on one screen.

For example, the first device 100 may execute a first application and a second application. The first device 100 may simultaneously display an execution window of the first application and an execution window of the second application on a screen. Hereinafter, for convenience of description, the execution window of the first application is referred to as a first window 10 and the execution window of the second application is referred to as a second window 20.

In the present exemplary embodiment, the first device 100 may display the first window 10 and the second window 20 in different manners. For example, the first device 100 may display the second window 20 as a full screen window, and may display the first window 10 over the second window 20 smaller than a size of the second window 20.

Also, the smaller first window 10 may be displayed as a floating window. Here, the floating window may be a user interface object that is movable according to a user input. For example, based on the user input, the first device 100 may move the first window 10 and may display the first window 10 at another position over the second window 20. Hereinafter, for convenience of description, a window that is displayed smaller than a size of a full screen and is movable is referred to as a floating window. Also, a mode during which the floating window is provided is referred to as a floating mode.

In the present exemplary embodiment, the first device 100 may operate in a sharing mode or a synchronization mode. The 'sharing mode' may indicate a mode during which the first device 100 shares content, which is provided by the second application, with the second device 200 via the first application.

In the present exemplary embodiment, the 'synchronization mode' may indicate a mode during which the first device 100 remotely controls the second device 200 so that content that is displayed on the second window 20 of the first device 100 is also displayed on a screen of the second device 200.

In the present exemplary embodiment, the first device 100 may receive a touch input. Throughout the specification, the term "touch input" indicates a gesture of a user which is performed on a touch screen so as to control the first device 100. For example, the touch input may include a tap gesture, a touch & hold gesture, a double tap gesture, a drag gesture, a panning gesture, a flick gesture, a drag & drop gesture, or the like.

"Tapping" is a user's motion of touching a screen by using a finger or a touch tool (e.g., an electronic pen) and then instantly lifting the finger or touch tool from the screen.

"Touching & holding" is a user's motion of touching a screen by using a finger or a touch tool (e.g., an electronic pen) and then maintaining the above touching motion for a critical time (e.g., 2 seconds) or longer, after touching the screen. For example, a time difference between a touch-in time and a touch-out time is greater than or equal to the critical time (e.g., 2 seconds). When a touch input lasts more than the critical time, an optional feedback signal may be provided in a visual, acoustic, or tactile manner so as to inform the user whether the touch input is tapping or touching & holding. In other exemplary embodiments, the critical time may vary.

"Double tapping" is a user's motion of rapidly touching the screen twice by using a finger or touch tool (such as an electronic pen).

"Dragging" is a user's motion of touching a screen by using the finger or touch tool and moving the finger or touch tool to another position on the screen while maintaining the touching. The dragging motion may enable the moving or panning motion of an object.

"Panning" is a user's motion of a dragging motion without selecting an object. Since no object is selected in the panning motion, either the page itself is moved on the screen, or a group of objects may be moved within a page.

"Flicking" is a user's motion of rapidly performing a dragging motion over a critical speed (e.g., 100 pixel/s) by using the finger or touch tool. The dragging (panning) motion or the flicking motion may be distinguished from each other based on whether or not a moving speed of the finger or touch tool is over the critical speed (e.g., 100 pixel/s).

"Dragging & Dropping" is a user's motion of dragging an object to a predetermined position on the screen with the finger or touch tool and then dropping the object at that position by lifting the finger or touch tool off the screen.

"Pinching" is a user's motion of moving two fingers touching the screen in opposite directions. The pinching motion is a gesture to magnify (open pinch) or contract (close pinch) an object or a page. A magnification value or a contraction value is determined according to the distance between the fingers.

"Swiping" is a user's motion of touching an object on the screen with the finger or touch tool and simultaneously moving the object horizontally or vertically by a predetermined distance. A swiping motion in a diagonal direction may not be recognized as a swiping event.

In the present exemplary embodiment, the first application and the second application may be controlled by using the same input method. For example, the first application and the second application may be controlled by a touch input method.

In another exemplary embodiment, the first application and the second application may be controlled by using different input methods. For example, the first application may be controlled by a touch input, and the second application may be controlled by a voice input. Alternatively, the first application may be controlled by a touch input, and the second application may be controlled by an ocular input. An ocular input method may recognize a blinking motion of the user's eye, a gaze position, a moving speed of his or her eye, etc. so as to control the first device 100.

In the present disclosure, the first device 100 may be embodied in various forms. For example, the first device 100 may be, but is not limited to, a mobile phone, a smartphone, a laptop computer, a tablet personal computer (PC), an electronic book terminal, a digital broadcast terminal, a personal digital assistant (PDA), a portable multimedia player (PMP), a navigation device, an audio player, a digital camera, or a wearable device (e.g., glasses or a wrist watch).

The second device 200 may include at least one communication module for receiving data from the first device 100. For example, the second device 200 may include, but is not limited to, a mobile communication module (e.g., 3G, 4G, or 5G), short-range communication (e.g., a Bluetooth communication module, a Bluetooth Low Energy (BLE) communication module, a Wi-Fi communication module, a ZigBee communication module, an IrDA communication module, a WFD communication module, an UWB communication module, or an Ant+ communication module) or a home network communication module.

In the present exemplary embodiment, the second device 200 may also display a floating window. For example, the second device 200 may communicate with the first device 100, and may display notice information in the floating window indicating that data is received from the first device 100.

In the present exemplary embodiment, the second device 200 may be of various types. For example, the second device 200 may be, but is not limited to, a mobile phone, a smart phone, a laptop computer, a tablet PC, an electronic-book terminal, a terminal for digital broadcasting, a Personal Digital Assistant (PDA), a Portable Multimedia Player (PMP), an audio device, a navigation device, an audio-player, a digital camera, a smart TV, glasses, a wrist watch, a home sync., a refrigerator, an air-conditioner, or a water purifier that has a communication function.

Hereinafter, an exemplary method of transmitting data from the first device 100 to the second device 200, by using a floating window, will be described in detail with reference to FIG. 2.

Figure 2:
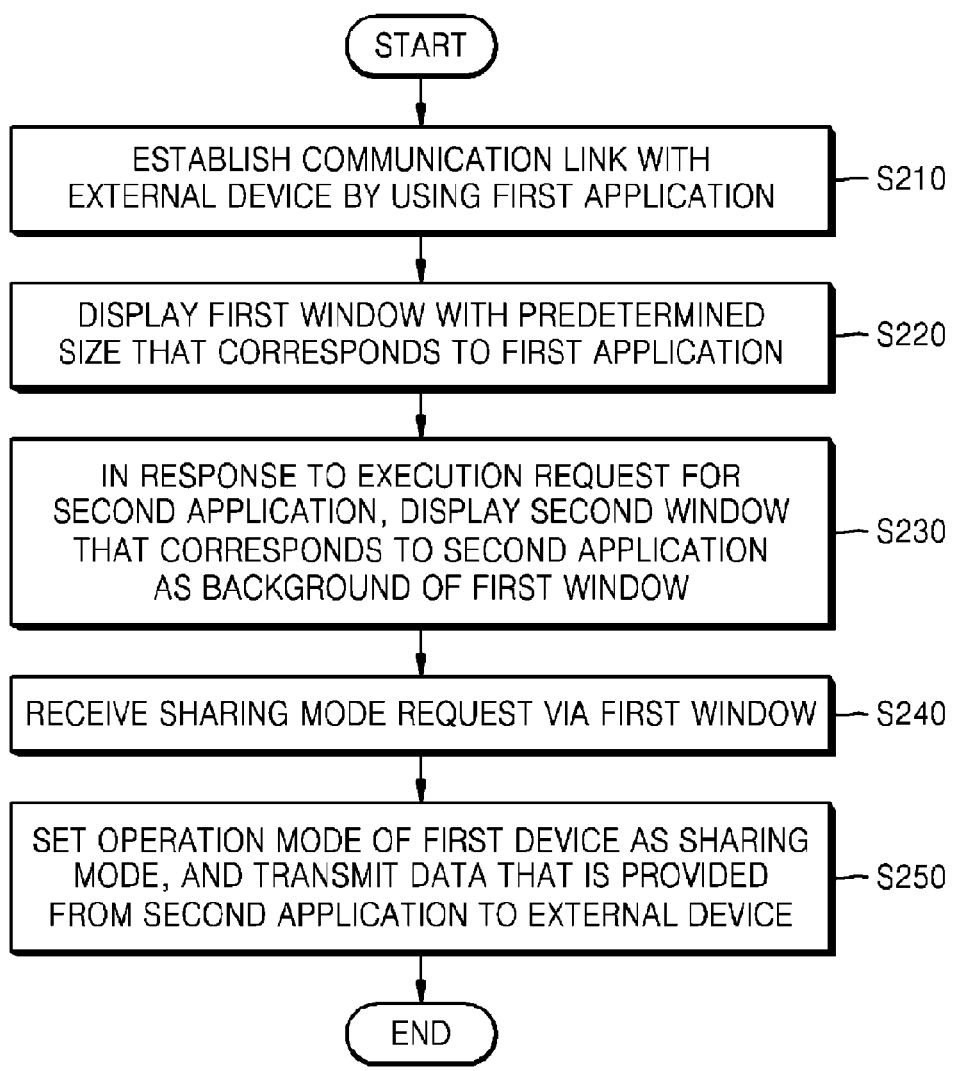
FIG. 2 is a flowchart illustrating an exemplary method of transmitting data.

FIG. 2 is a flowchart of a method of transmitting data, according to an exemplary embodiment of the present disclosure.

In operation S210, the first device 100 may establish a communication link with an external device by using a first application. For example, the first device 100 may establish the communication link with the second device 200 by using the first application.

In the present exemplary embodiment, the first application may be an application for establishing a communication link. For example, the first application may be, but is not limited to, a voice call application, a moving picture call application, a messenger application, or a data transmission application. Hereinafter, for convenience of description, it is assumed that the first application is a voice call application.

In the present exemplary embodiment, the first device 100 may establish various communication links. For example, the first device 100 may establish a mobile communication link by using a call application. Also, the first device 100 may establish a short-range communication link (e.g., Wi-Fi, Bluetooth, BLE, ANT+, etc.) by using the data transmission application.

In the present exemplary embodiment, the first device 100 may indirectly establish a communication link with the second device 200 via an access point, a home gateway, or a server. Also, the first device 100 may directly establish a communication link with the second device 200 via a short-range communication.

In the present exemplary embodiment, the first device 100 may transmit a communication connection request to the second device 200 by using identification (ID) information of the second device 200 (e.g., a MAC address, a Bluetooth address, a device ID, an internet protocol (IP) address, etc.). Here, when the second device 200 responds to the communication connection request from the first device 100, the communication link may be established between the first device 100 and the second device 200.

In another exemplary embodiment, the first device 100 may receive and respond to a communication connection request from the second device 200, and thus may establish a communication link with the second device 200.

In operation S220, the first device 100 may display a first window corresponding to the first application, the first window having a size smaller than a size of a screen of the first device 100.

In the present exemplary embodiment, a user of the first device 100 may preselect the size or a shape of the first window. Alternatively, the size or the shape of the first window may be determined at the time of generation or distribution of the first application. Furthermore, the size or the shape of the first window displayed on the screen may be adjusted according to a user input.

In the present exemplary embodiment, the first device 100 may display the first window as a floating window. For example, the first device 100 may move the first window according to a drag input by the user. Also, the first device 100 may move the first window to a position where a user's touch is sensed or to a location based on a user's voice input.

The first window displayed on the first device 100 may display connection time information (e.g., 1:40) about the communication link with the second device 200. Also, when the first device 100 receives data from the second device 200, the first device 100 may display notice information on the first window indicating reception of the data.

In operation S230, in response to a request to execute a second application, the first device 100 may display a second window corresponding to the second application as a background of the first window.

The first device 100 may receive the execution request for the second application from the user. For example, the user may select a specific button included in the first device 100 in order to request the first device 100 to execute the second application. Here, the specific button may be a physical button or a virtual button in the form of graphical user interface (GUI). For example, the user may touch an icon corresponding to the second application and thus request execution of the second application by the first device 100.

Also, the user may connect an external apparatus to the first device 100 so as to request for the execution of the second application. Here, the external apparatus may be connected to the first device 100 in a wired or wireless manner. In the present exemplary embodiment, the external apparatus may be, but is not limited to, an earphone, a charger, an electronic pen, or a TV.

The first device 100 may display the second window corresponding to the second application as a full screen window, i.e., the first device 100 may display the second window with a full size. Here, the second window may be displayed as the background of the floating first window.

In the present exemplary embodiment, a type of the second application may vary. For example, the second application may be, but is not limited to, at least one of a camera application, a photo management application, a music reproduction application, a moving picture reproduction application, or a web browser.

In operation S240, the first device 100 may receive a sharing mode request via the first window. A sharing mode may indicate a mode during which the first device 100 shares data with the second device 200 via the first window, wherein the communication link is established between the first device 100 and the second device 200.

In the present exemplary embodiment, the sharing mode request may vary. For example, the first device 100 may receive a touch and hold user input on the first window, for at least a predetermined time (e.g., 3 seconds), as a request to start the sharing mode. Also, when the user swipes the first window, flicks the first window, or touches the first window a predetermined number of times (e.g., a double-tap), the first device 100 may determine the sharing mode request from the user.

In operation S250, in response to the sharing mode request, the first device 100 may set an operation mode of the first device 100 as the sharing mode. In the present exemplary embodiment, the first device 100 may display an indicator on the first window indicating the sharing mode. For example, in order to indicate the sharing mode, the first device 100 may change a shape, a color, a brightness, or a chroma of the first window; also, the first device 100 may change a color or a thickness of edge lines of the first window In the sharing mode, the first device 100 may transmit data from the second application to the external device. For example, the first device 100 may transmit the data to the second device 200 via the communication link that is established by the first application.

In the present exemplary embodiment, the data provided from the second application may include, but is not limited to, at least one of content that is displayed on the second window, content that is selected in the second window, and content that is reproduced via the second window.

In the present exemplary embodiment, the content may include, but is not limited to, still image content (e.g., a photo, etc.), sound content (e.g., music, an audio book, an instrument play piece, radio broadcasting content, etc.), moving picture content (e.g., a television program moving picture, Moving picture-On-Demand (VOD), a personal moving picture such as User-Created Contents (UCC), a music video, a YouTube video, etc.), text content (e.g., an electronic book, a letter, a work file, etc.), and webpage content.

In other exemplary embodiments, operations S210 through S250 may be performed in a different order, or some operations may be skipped. Hereinafter, a method performed by the first device 100 of providing a first window with a predetermined size will be described in detail with reference to FIGS. 3A, 3B, and 3C.

Figure 3A:
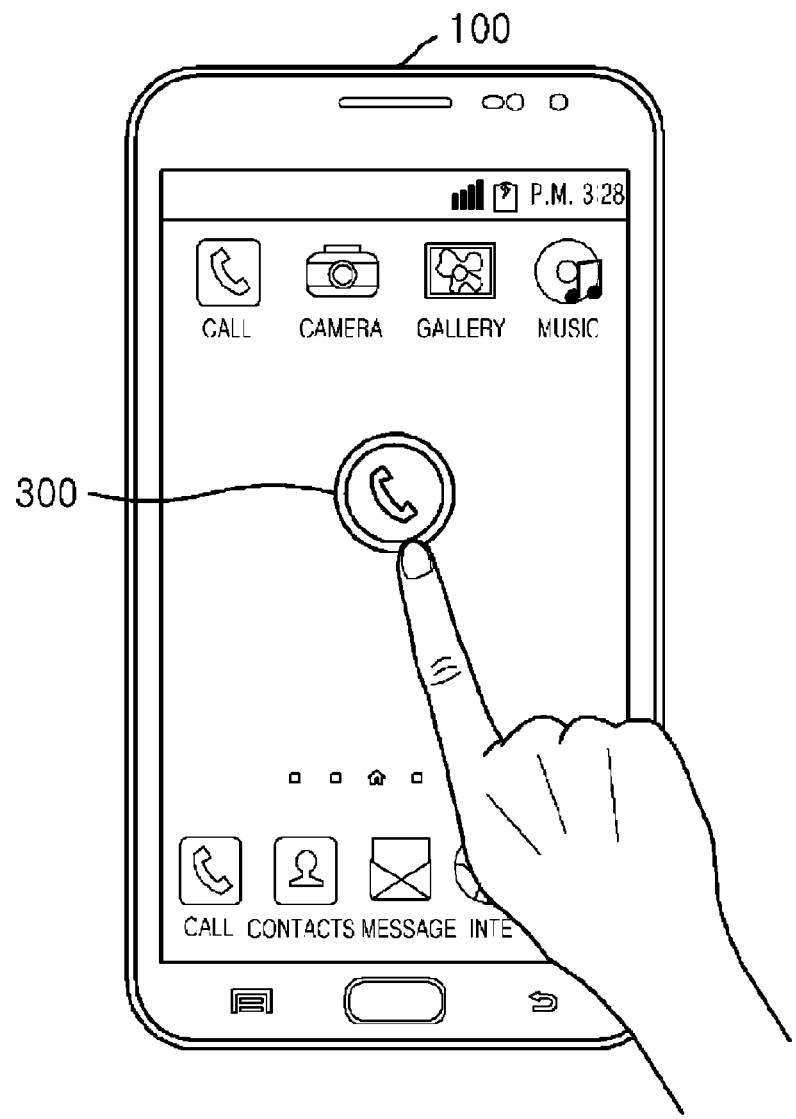
FIGS. 3A, 3B, and 3C are diagrams illustrating an exemplary device providing a window of a predetermined size.
Figure 3B:
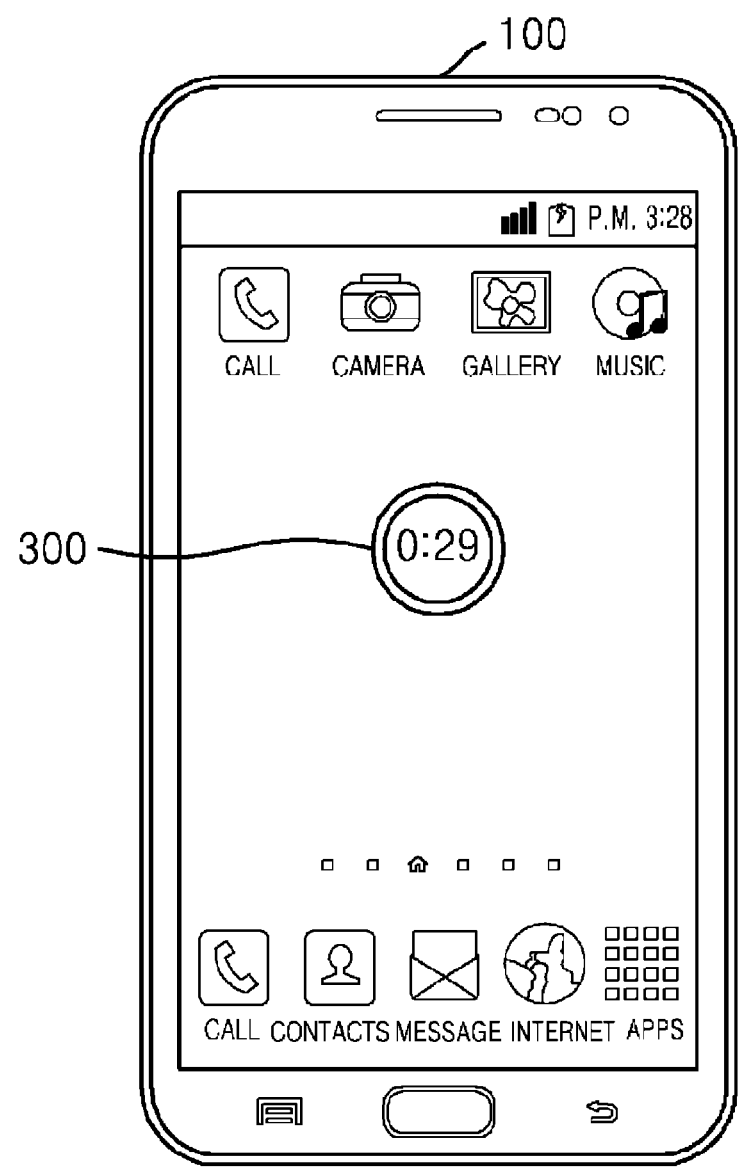
Figure 3C:
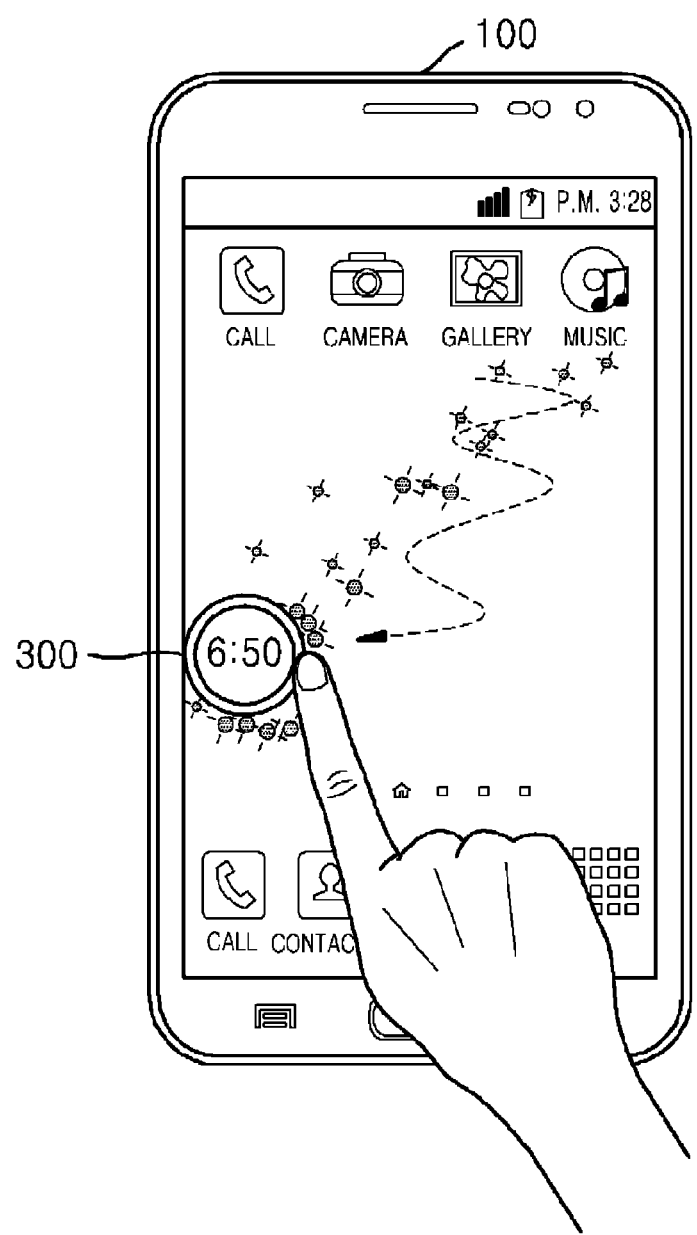

FIGS. 3A, 3B, and 3C illustrate an exemplary device providing a window of a predetermined size, according to an exemplary embodiment of the present disclosure. In the exemplary embodiment of FIGS. 3A, 3B, and 3C, it is assumed that the first application is a call application.

As illustrated in FIG. 3A, the first device 100 may receive a call connection request from the second device 200 (e.g., a friend's device). In this case, the first device 100 may execute a call application, based on the call connection request. The first device 100 may display a first window 300 in the form of floating window that is an execution window of the call application.

In the present exemplary embodiment, the first device 100 may display, on the first window 300, caller information (e.g., a caller image, a caller phone number, a caller name, etc.) about a caller who initiated the call connection request.

In the present exemplary embodiment, a user of the first device 100 may answer or reject a call connection request by moving the first window 300 upward, downward, leftward, or rightward.

As illustrated in FIG. 3B, when the user of the first device 100 accepts the call connection request by moving the first window 300, the first device 100 may establish a communication channel with the second device 200. Here, the first device 100 may keep displaying the first window 300 in the form of a floating window. The first device 100 may also display call connection time information (e.g., 0:29) on the first window 300.

Referring to FIG. 3C, the first device 100 may receive a movement request with respect to the first window 300. For example, the first device 100 may receive a user input of dragging the first window 300.

The first device 100 may move the first window 300, based on the movement request. For example, the first device 100 may move the first window 300 displayed on an upper right corner of a screen toward a lower left corner of the screen, based on a touch and drag input by the user. The first device 100 may then display the first window 300 in the lower left corner of the screen. The first device 100 may provide a graphical effect (e.g., to display a star, etc.) when the first window 300 is moved.

In the example of FIG. 3C, the first window 300 is moved based on a touch input by the user. However, the present disclosure is not limited thereto. For example, the first window 300 may be moved based on a voice input, a motion input, a bending input, or a key input by the user.

Figure 4:
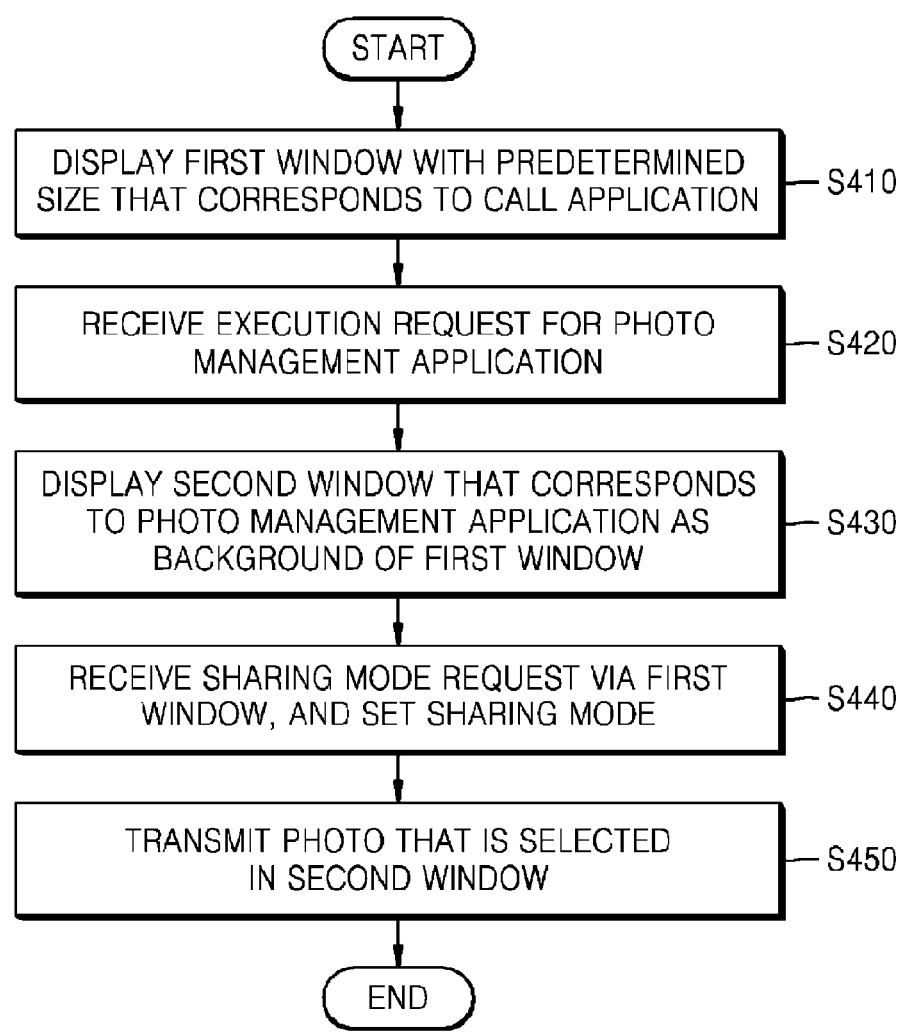
FIG. 4 is a flowchart illustrating an exemplary method of transmitting photo content to an external device by using a call application.

FIG. 4 is a flowchart of a method of transmitting photo content to an external device by using a call application, the method performed by a device, according to an exemplary embodiment of the present disclosure.

In operation S410, the first device 100 may establish a communication link with the second device 200 by using a call application, and may display a first window with a predetermined size that corresponds to the call application. For example, the first device 100 may display the first window in the form of floating window.

In operation S420, the first device 100 may receive an execution request for a photo management application. In operation S430, the first device 100 may display a second window corresponding to the photo management application as a background of the first window. In the present exemplary embodiment, the second window may be displayed as a full screen window on a screen of the first device 100.

In the present exemplary embodiment, a photo list including at least one photo may be displayed on the second window. Alternatively, one or more photos may be categorized and displayed on the second window. In other exemplary embodiments, the first device may display photos based on metadata, facial recognition, user history, or any other factors.

In operation S440, the first device 100 may receive a sharing mode request via the first window while the second window is displayed as the background of the first window. Here, in response to the sharing mode request, the first device 100 may enter a sharing mode. Thereafter, the first device 100 may display an indicator indicating the sharing mode on the first window.

In operation S450, a photo that is selected in the second window of the first device 100 may be transmitted. For example, while in the sharing mode, when the user selects at least one of the photos displayed on the second window, the first device 100 may transmit the selected photo or photos to the second device 200 via the communication link established by the call application.

In the present exemplary embodiment, the user of the first device 100 may conveniently transmit the selected photo or photos to the second device 200 of a person on the phone, by using the floating window. This will be described in detail with reference to FIGS. 5A through 5E.

FIGS. 5A through 5E illustrate an example of a device transmitting photo content to an external device by using a call application, according to an exemplary embodiment of the present disclosure. In the exemplary embodiment of FIGS. 5A through 5E, a communication link is established between the first device 100 and the second device 200 using a call application.

Figure 5A:
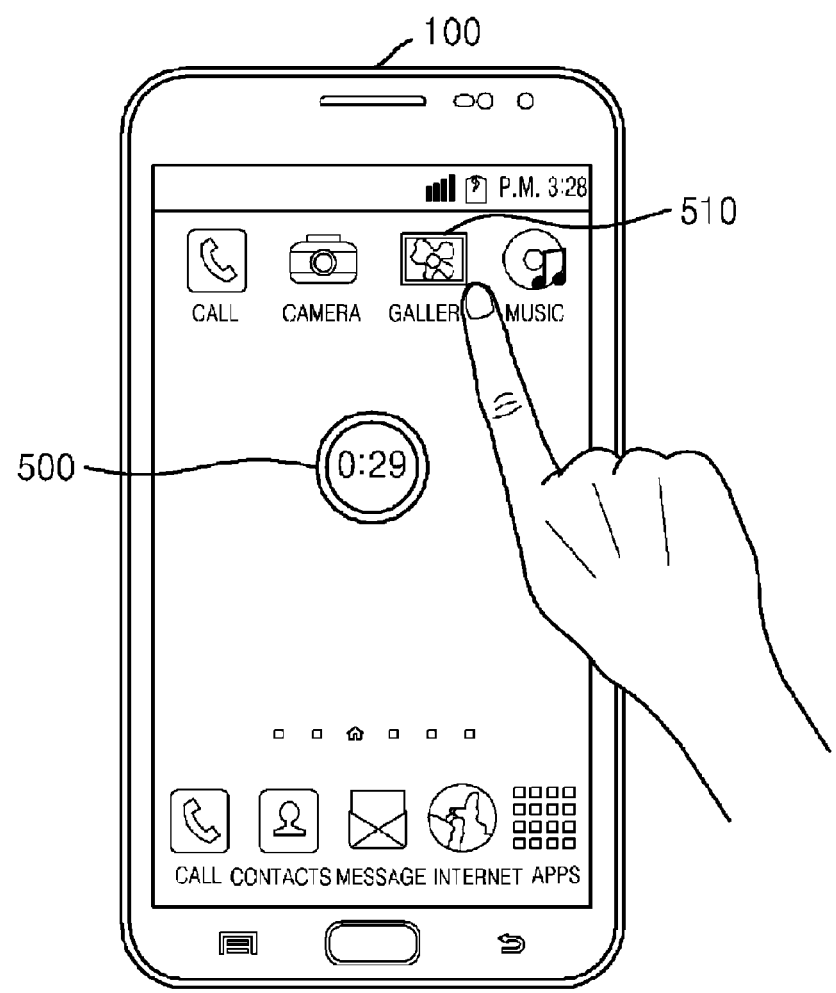
FIGS. 5A through 5E are diagrams illustrating an exemplary device transmitting photo content to an external device by using a call application.

Referring to FIG. 5A, the first device 100 may display a first window 500 in the form of floating window that corresponds to a call application. A call connection time may be displayed on the first window 500. Also, the first window 500 may be moved according to a user input.

In the present exemplary embodiment, when the first device 100 receives a touch input corresponding to an icon 510 of a photo management application, the first device 100 may execute the photo management application.

Figure 5B:
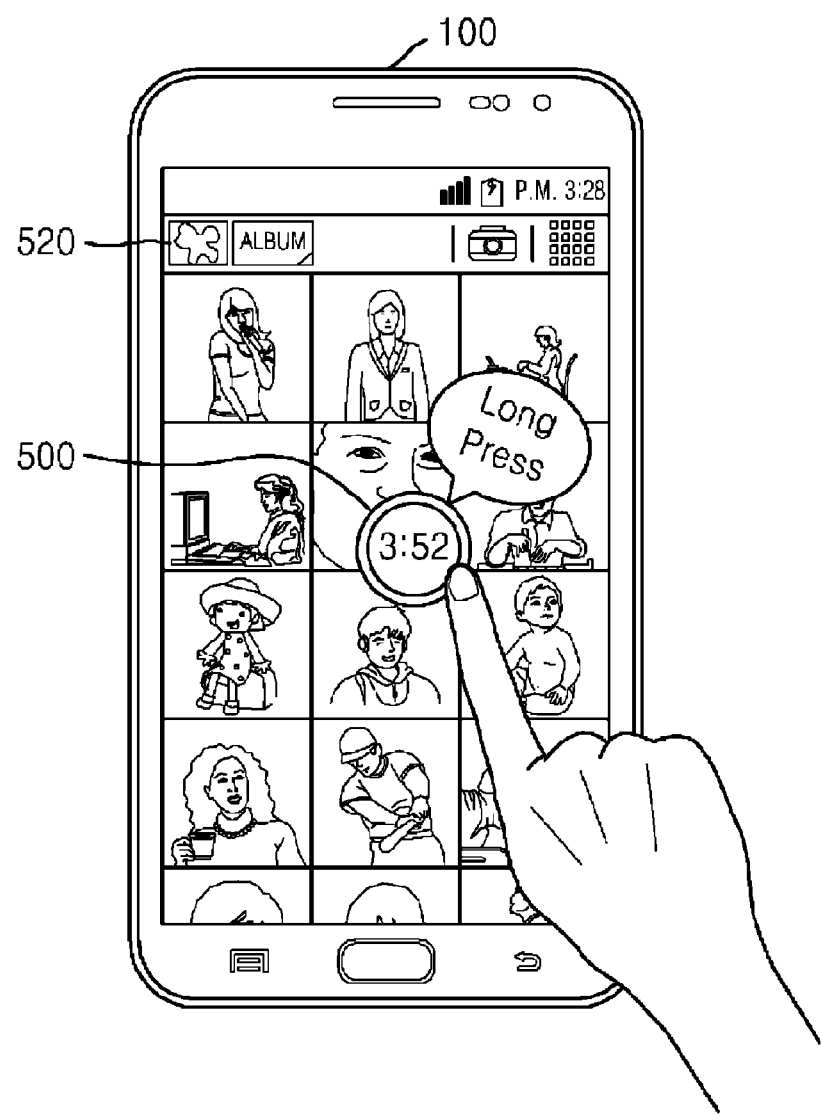

In this case, as illustrated in FIG. 5B, the first device 100 may display, as a background of the first window 500, a second window 520 that corresponds to the photo management application. That is, the first device 100 may display the first window 500 over the second window 520.

While the second window 520 is displayed as the background of the first window 500, the first device 100 may receive a sharing mode request via the first window 500. For example, the first device 100 may receive, as the sharing mode request, a user input of touching the first window 500.

Figure 5C:
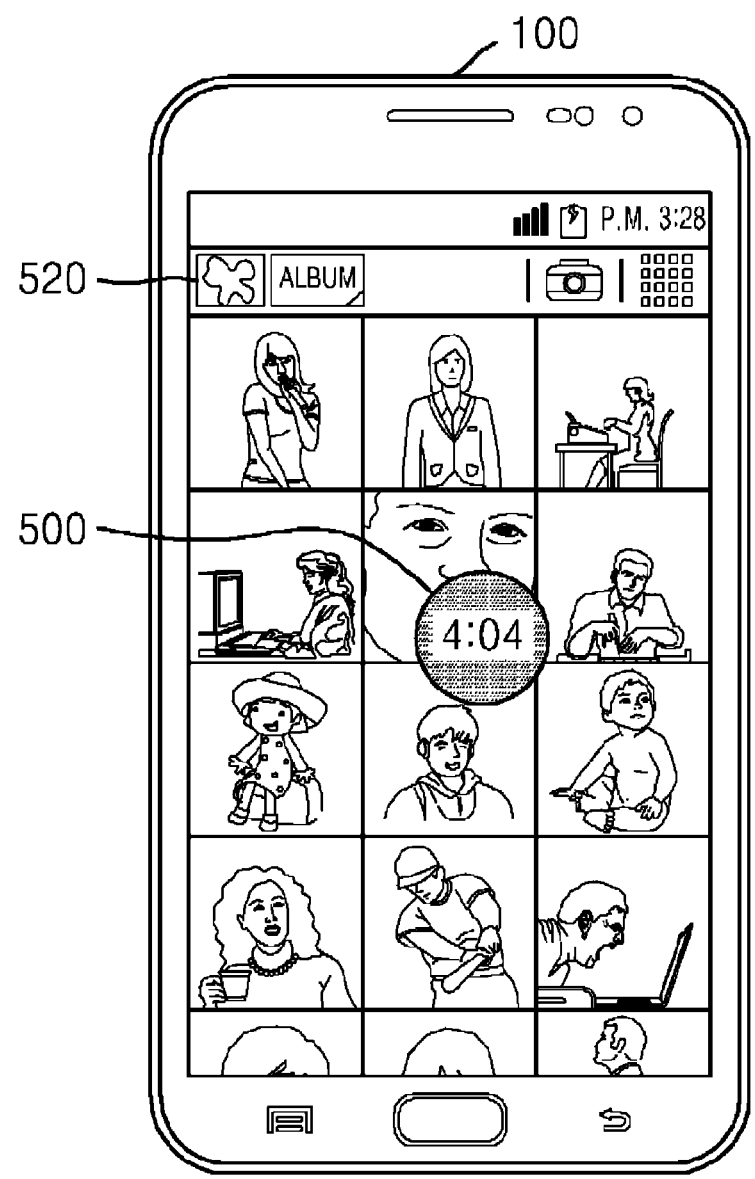

As illustrated in FIG. 5C, in response to the sharing mode request from the user, the first device 100 may change its operation mode to a sharing mode and may, on the first window 500, display an indicator indicating that the operation mode is the sharing mode. For example, the first window 500 may be a white color during a normal mode, and may be a green color during the sharing mode.

Figure 5D:
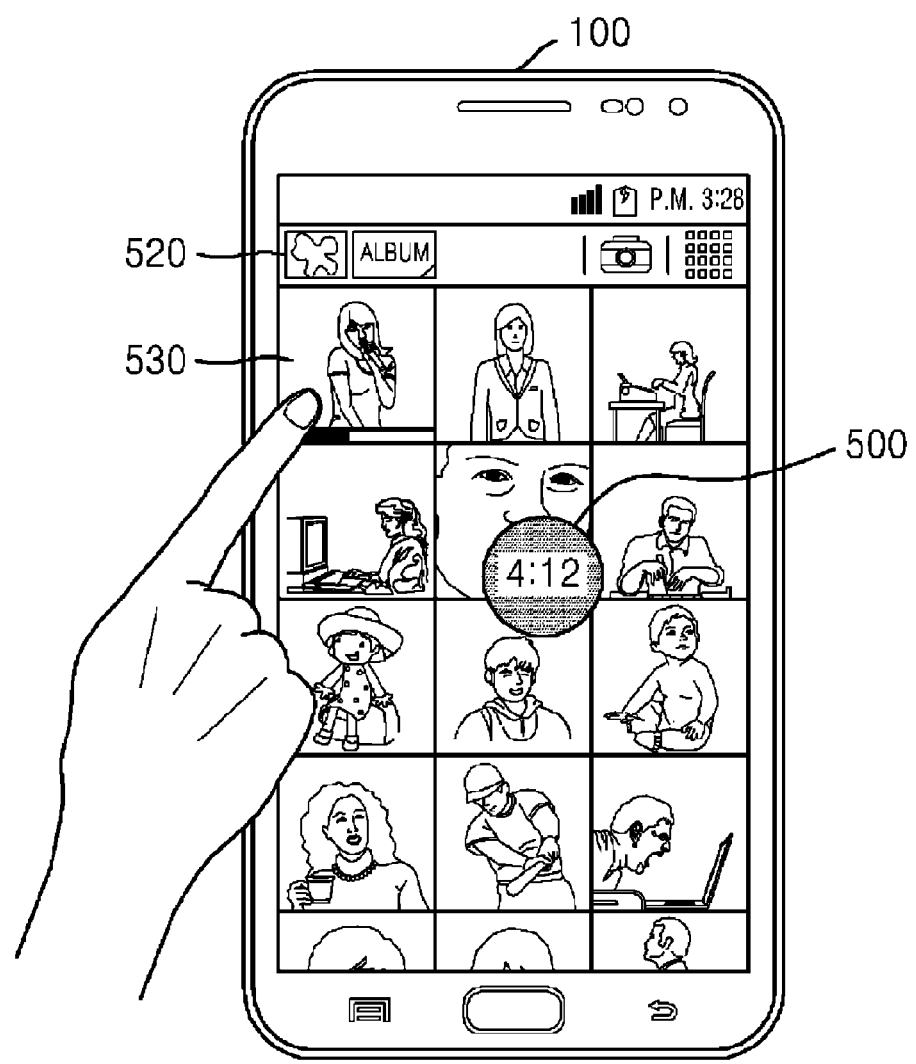

As illustrated in FIG. 5D, when the user selects first photo content 530 during the sharing mode, the first device 100 may transmit the first photo content 530 to the second device 200 with which the communication link is established. Here, the first device 100 may display transmission progress of the first photo content 530 at a position under the first photo content 530.

Figure 5E:
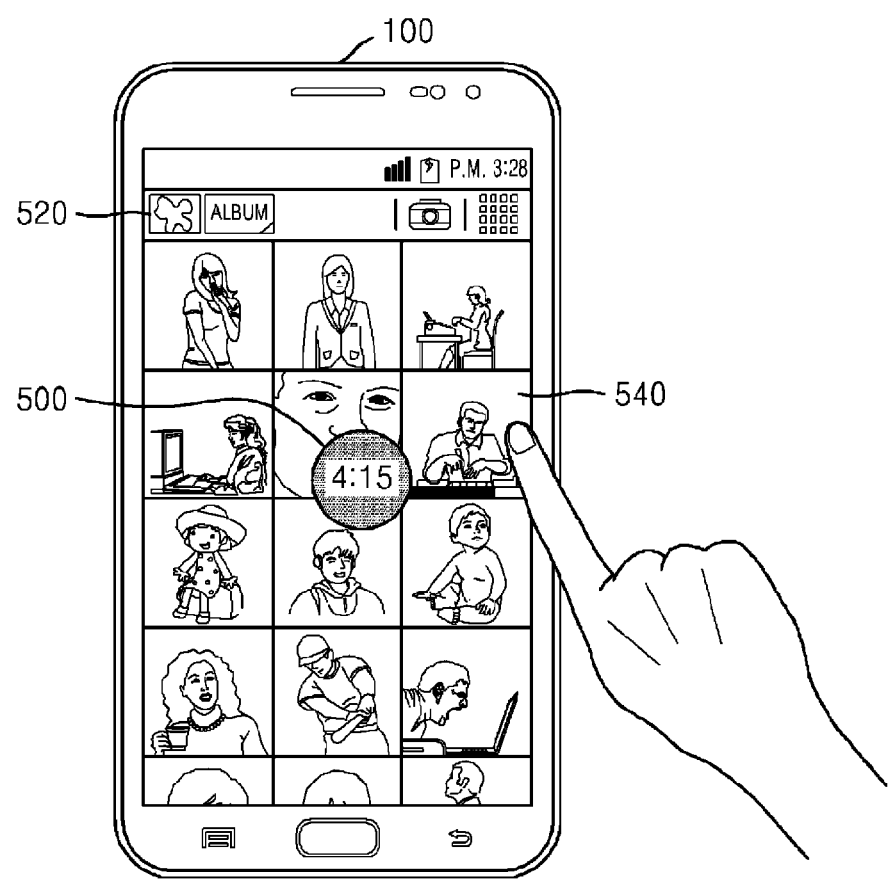

As illustrated in FIG. 5E, during the sharing mode (e.g., while the first window 500 is displayed green), when the user selects second photo content 540, the first device 100 may transmit the second photo content 540 to the second device 200 with which the communication link is established. Here, the first device 100 may display transmission progress of the second photo content 540 at a position under the second photo content 540.

Figure 6:
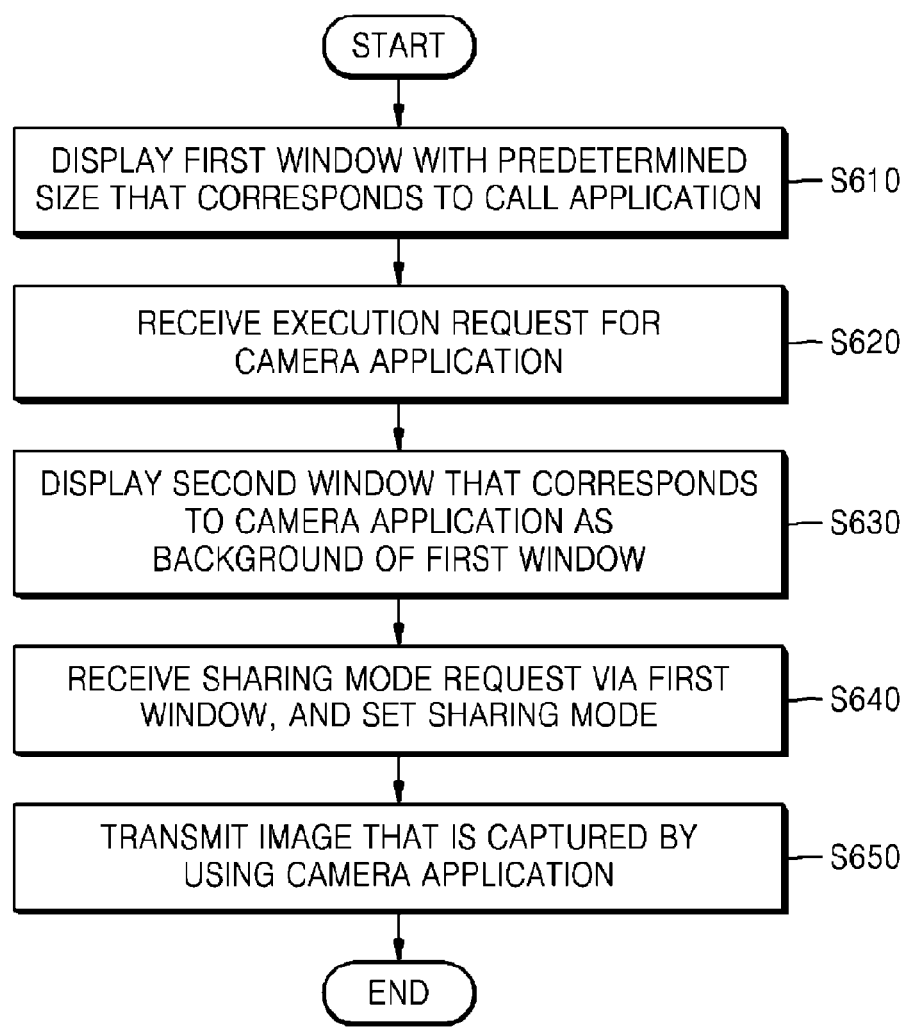
FIG. 6 is a flowchart illustrating an exemplary method of transmitting an image captured by using a camera application to an external device.

FIG. 6 is a flowchart of a method of transmitting an image captured by a camera application to an external device, the method performed by a device, according to an exemplary embodiment of the present disclosure.

In operation S610, the first device 100 may establish a communication link with the second device 200 by using a call application, and may display a first window corresponding to the call application. For example, the first device 100 may display the first window in the form of a floating window.

In operation S620, the first device 100 may receive a request to execute the camera application.

In operation S630, the first device 100 may display a second window that corresponds to the camera application, as a background of the first window. In the present exemplary embodiment, the second window may be displayed as a full screen window on a screen of the first device 100.

In operation S640, while the second window is displayed as the background of the first window, the first device 100 may receive a sharing mode request via the first window. Here, in response to the sharing mode request, the first device 100 may change the operation mode to a sharing mode. Thereafter, the first device 100 may display an indicator on the first window, indicating that the operation mode is the sharing mode.

In operation S650, the first device 100 may transmit a captured image to the second device 200 via the second window. For example, when a user captures an image using the camera application, the first device 100 may transmit the captured image to the second device 200 via the communication link that is established by the call application.

In the present exemplary embodiment, the user of the first device 100 may transmit the captured image to the second device 200 in real-time, by using the floating window. This will be described in detail with reference to FIGS. 7A, 7B, and 7C.

Figure 7A:
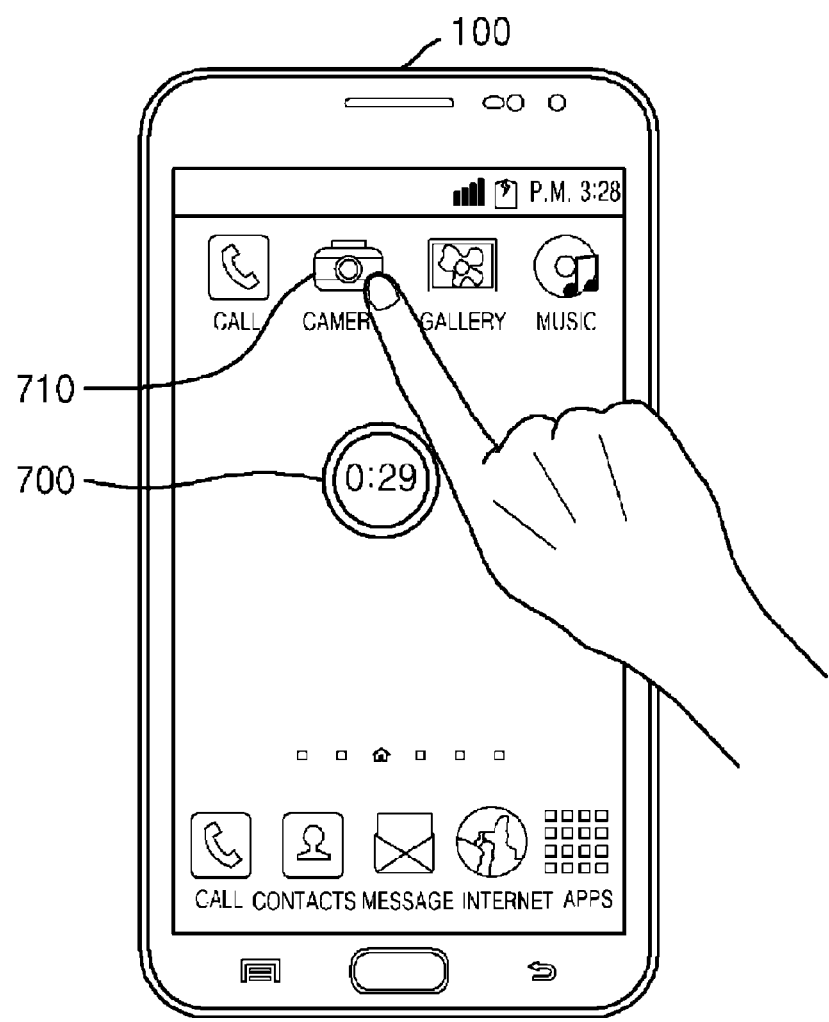
FIGS. 7A, 7B, and 7C are diagrams illustrating an exemplary device transmitting an image captured by using a camera application to an external device.
Figure 7B:
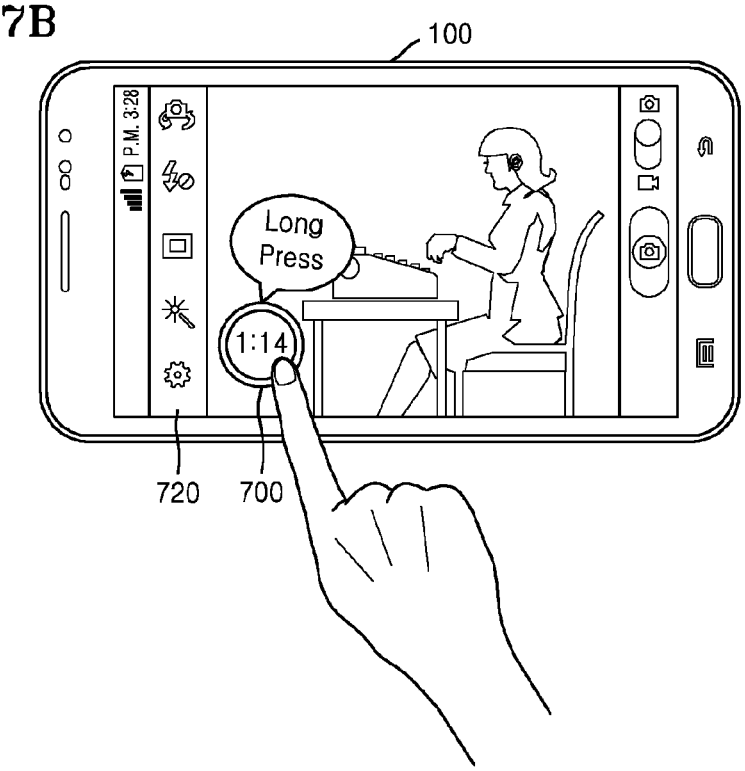
Figure 7C:
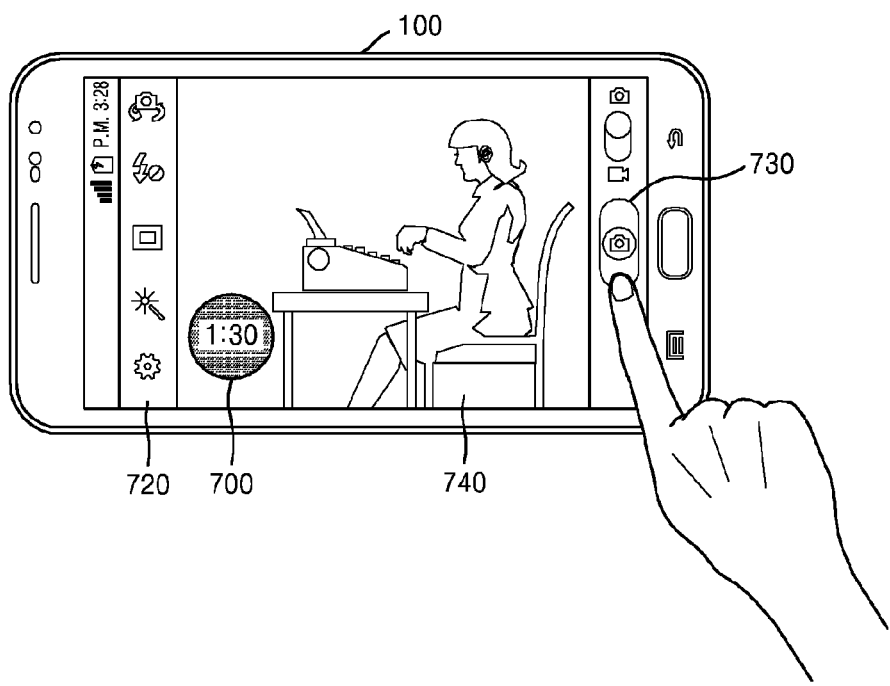

FIGS. 7A, 7B, and 7C illustrate an example of a device transmitting an image captured by a camera application to an external device, the method performed by the device, according to an exemplary embodiment of the present disclosure. In the exemplary embodiment of FIGS. 7A, 7B, and 7C, it is assumed that a communication link is established between the first device 100 and the second device 200 by a call application.

Referring to FIG. 7A, the first device 100 may display a floating first window 700 that corresponds to a call application. A call connection time (e.g., 0:29) may be displayed on the first window 700 in the form of floating window. Also, the first window 700 may be moved according to a user input.

In the present exemplary embodiment, when the first device 100 receives a touch input from a user corresponding to an icon 710 of the camera application, the first device 100 may execute the camera application.

As illustrated in FIG. 7B, the first device 100 may display, as a background of the first window 700, a second window 720 that is an execution window of the camera application. That is, the first device 100 may display the first window 700 over the second window 720.

In the present exemplary embodiment, while the second window 720 is displayed as the background of the first window 700, the first device 100 may receive a sharing mode request via the first window 700. For example, the first device 100 may receive, as the sharing mode request, a user input of touching the first window 700 for more than a predetermined time (e.g., over 2 seconds).

As illustrated in FIG. 7C, in response to the sharing mode request from the user, the first device 100 may convert its operation mode to a sharing mode and may display an indicator indicating that the operation mode is the sharing mode, on the first window 700. For example, the first window 700 that is a white color during a normal mode may be a blue color during the sharing mode.

When the user selects a capture button 730 so as to capture an image during the sharing mode (e.g., while the first window 700 is displayed blue), the first device 100 may generate a captured image 740. Then, the first device 100 may transmit in real-time the captured image 740 to the second device 200 with which the communication link is established.

Figure 8:
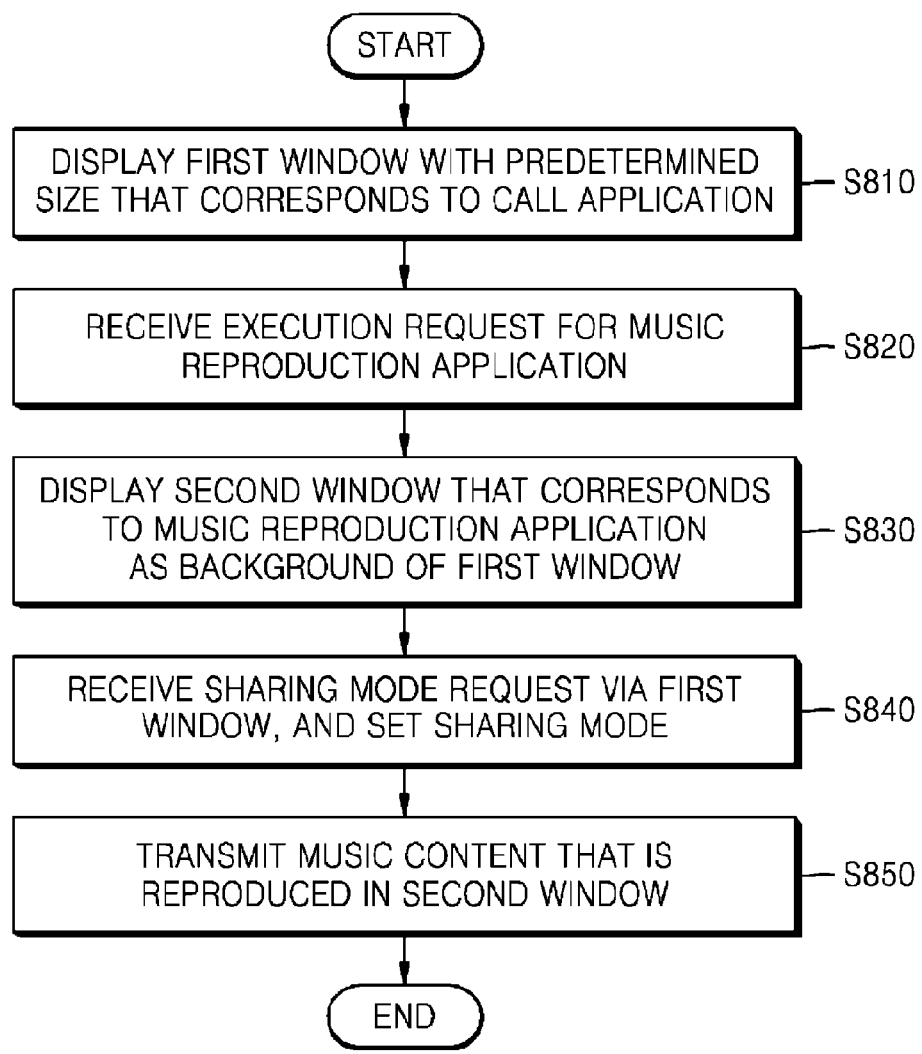
FIG. 8 is a flowchart illustrating an exemplary method of transmitting music content to an external device, the method performed by a device.

FIG. 8 is a flowchart of a method of transmitting music content to an external device, the method performed by a device, according to an exemplary embodiment of the present disclosure.

In operation S810, the first device 100 may establish a communication link with the second device 200 by using a call application, and may display a first window having a predetermined size that corresponds to the call application. For example, the first device 100 may display the first window in the form of floating window.

In operation S820, the first device 100 may receive an execution request for a music reproduction application. In operation S830, the first device 100 may display a second window corresponding to the music reproduction application, as a background of the first window. In the present exemplary embodiment, the second window may be displayed as a full screen window on a screen of the first device 100.

In the present exemplary embodiment, a music list including at least one piece of music content may be displayed on the second window. Also, information (e.g., a music title, an artist, an album title, an album image, lyrics, a reproduction position, etc.) about music that is currently reproduced may be displayed on the second window. Furthermore, control buttons (e.g., pause/play/fast-forward/rewind/play fast/play slow/last music of the music list/first music of the music list/select music folder/etc.) for controlling music reproduction may be displayed on the second window. Here, the control buttons may be in the form of a graphic user interface (GUI).

In operation S840, while the second window is displayed as the background of the first window, the first device 100 may receive a sharing mode request via the first window. Here, in response to the sharing mode request, the first device 100 may set its operation mode as a sharing mode and may then display an indicator in the first window indicating that the operation mode is the sharing mode.

In operation S850, the first device 100 may transmit, to the second device 200, music content that is reproduced by the application displayed in the second window. For example, when a user reproduces at least one piece of music content via the second window during the sharing mode, the first device 100 may transmit in real-time the music content to the second device 200 via the communication link.

In the present exemplary embodiment, the user of the first device 100 may conveniently transmit the music content that is currently reproduced to the second device 200, by using the floating window. This will be described in detail with reference to FIGS. 9A, 9B, and 9C.

Figure 9A:
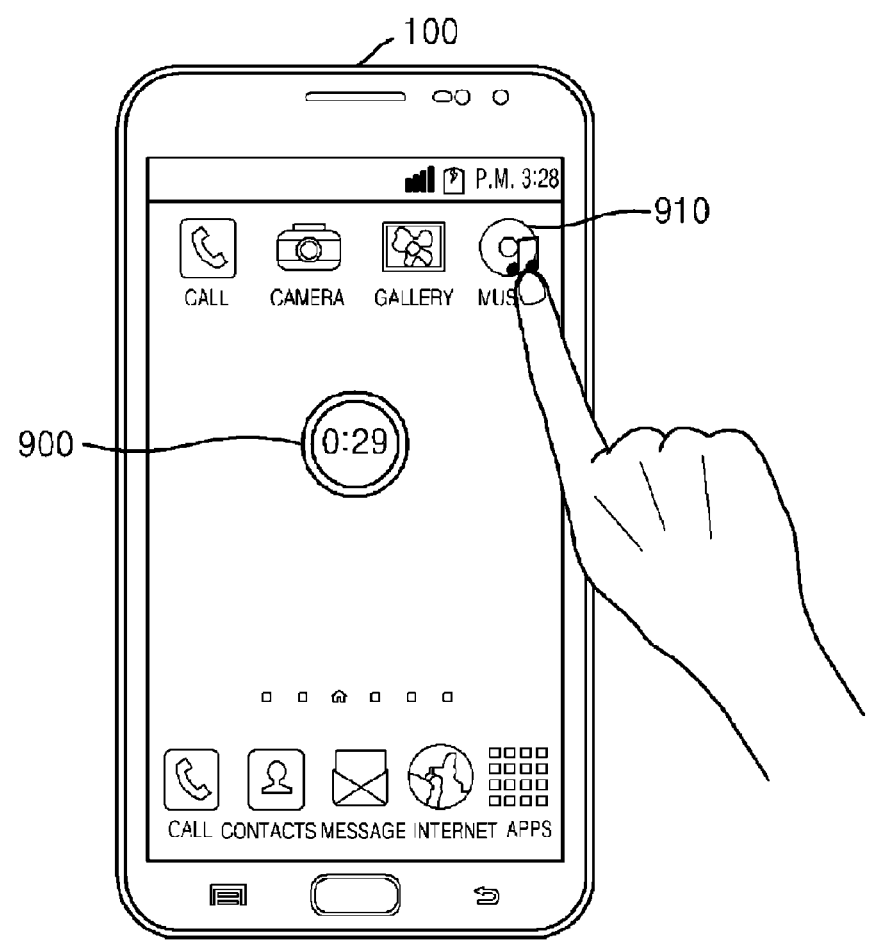
FIGS. 9A, 9B, and 9C are diagrams illustrating an exemplary device transmitting music content to an external device.
Figure 9B:
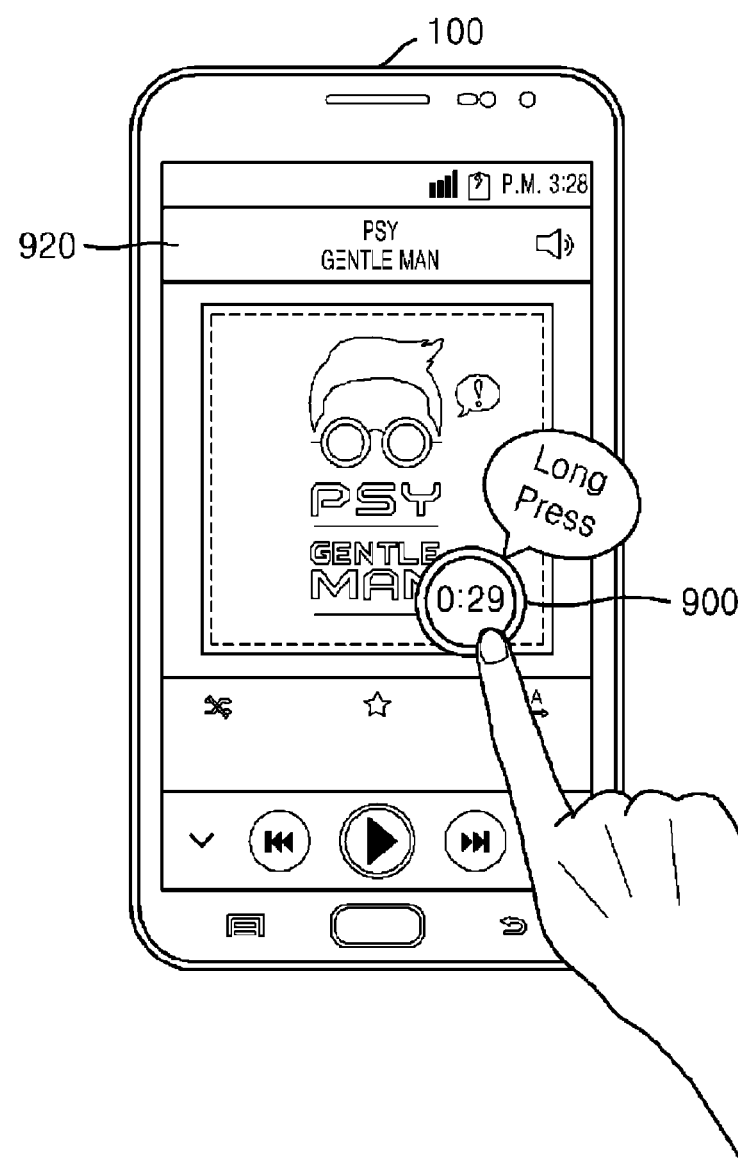
Figure 9C:
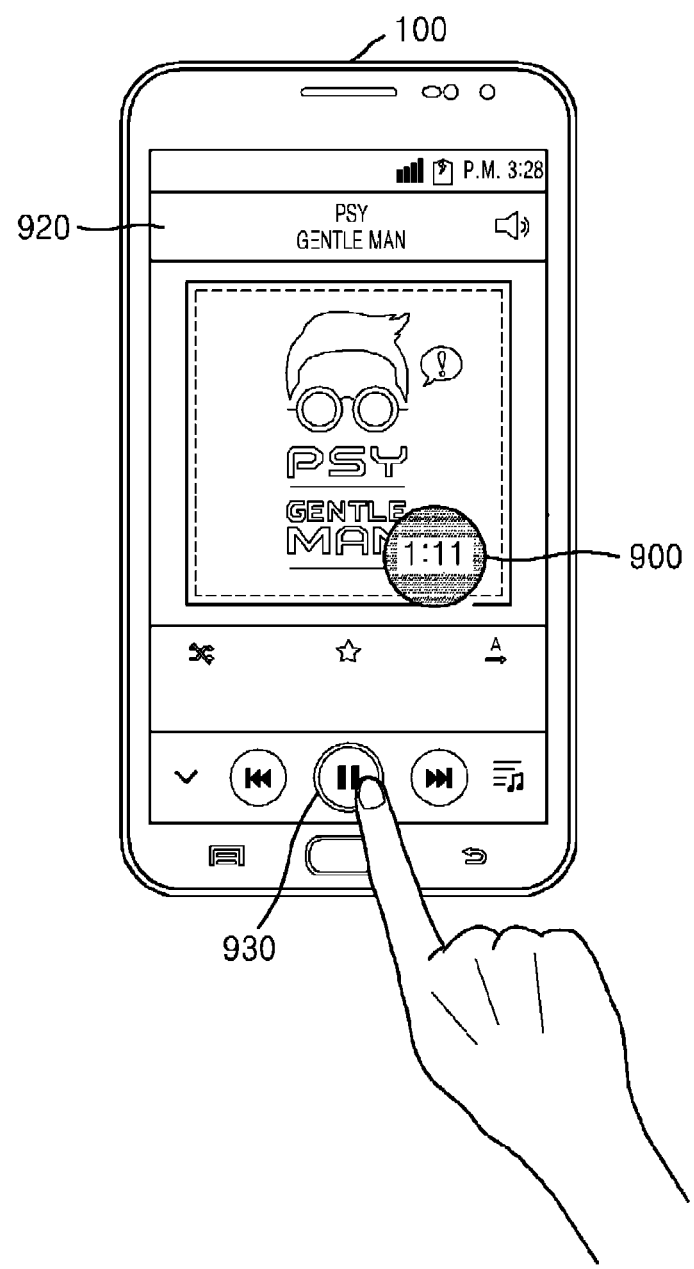

FIGS. 9A, 9B, and 9C illustrate an example of a device transmitting music content to an external device, according to an exemplary embodiment of the present disclosure. In the exemplary embodiment of FIGS. 9A, 9B, and 9C, a communication link is established between the first device 100 and the second device 200 by using a call application.

Referring to FIG. 9A, the first device 100 may display a floating first window 900 that corresponds to the call application. A call connection time (e.g., 0:29) may be displayed on the first window 900. Also, the first window 900 may be moved according to a user input.

In the present exemplary embodiment, when the first device 100 receives a touch input corresponding to an icon 910 representing a music reproduction application, the first device 100 may execute the music reproduction application.

As illustrated in FIG. 9B, the first device 100 may display a second window 920 that is an execution window of the music reproduction application, as a background of the first window 900. That is, the first device 100 may display the first window 900 over the second window 920.

In the present exemplary embodiment, while the second window 920 is displayed as the background of the first window 900, the first device 100 may receive a sharing mode request via the first window 900. For example, the first device 100 may receive, as the sharing mode request, a user input of touching the first window 900 for more than a predetermined time (e.g., over 2 seconds).

As illustrated in FIG. 9C, in response to the sharing mode request, the first device 100 may convert its operation mode to a sharing mode. The first device 100 may display, on the first window 900, an indicator indicating that the operation mode is the sharing mode. For example, the first window 900 is displayed as a white color during a normal mode, and the first window 900 may be displayed as a blue color during the sharing mode. In other exemplary embodiments, a shape of the first window 900 may be round during the normal mode, and may be changed to a quadrangular shape during the sharing mode.

When the user selects a media control button 930 so as to reproduce music content that is displayed on the second window 920 during the sharing mode (e.g., while the first window 900 is displayed blue), the first device 100 may reproduce the music content. Then, the music content that is currently played may be transmitted from the first device 100 to the second device 200 with which the communication link is established.

Figure 10:
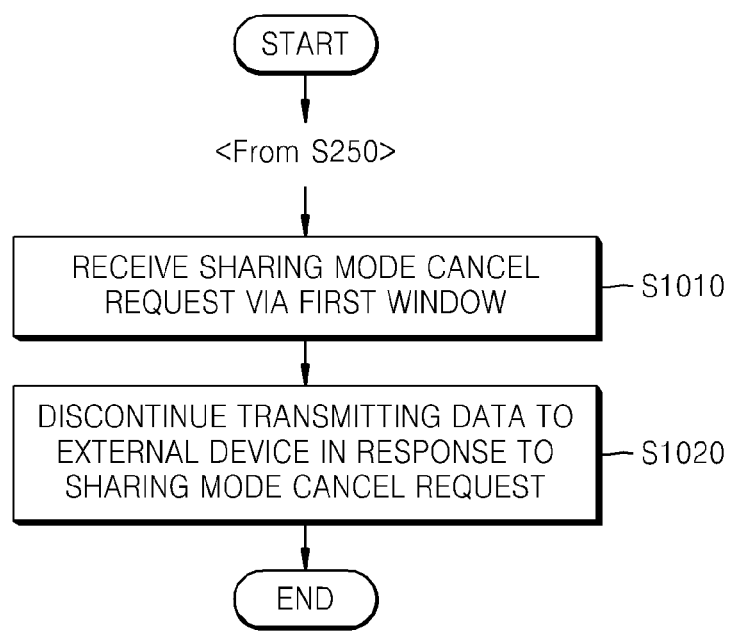
FIG. 10 is a flowchart illustrating an exemplary method of cancelling a sharing mode.

FIG. 10 is a flowchart of a method of cancelling a sharing mode, the method performed by a device, according to an exemplary embodiment of the present disclosure.

In operation S1010, the first device 100 may receive, while in the sharing mode, a sharing mode cancel request via a first window.

In the present exemplary embodiment, the sharing mode cancel request may vary. For example, the first device 100 may receive, as the sharing mode cancel request, a user input of touching the first window for more than a predetermined time (e.g., over 3 seconds). Other exemplary inputs than can be used as the sharing mode cancel request can include when a user swipes the first window, flicks the first window, or touches the first window more than a predetermined number of times (e.g., a double-tap).

In operation S1020, in response to the sharing mode cancel request, the first device 100 may discontinue transmitting data to an external device.

In the present exemplary embodiment, the first device 100 may display an indicator indicating a normal mode, on the first window. For example, the first device 100 may change a shape of the first window from a shape corresponding to a sharing-mode (e.g., a quadrangular shape) to a shape corresponding to a general-mode (e.g., a round shape). Also, in order to indicate that an operation mode has changed from the sharing mode to the normal mode, the first device 100 may change a color, brightness, or a chroma of the first window, or may change a color or a thickness of edge lines of the first window. This will be described in detail with reference to FIGS. 11A and 11B.

Figure 11A:
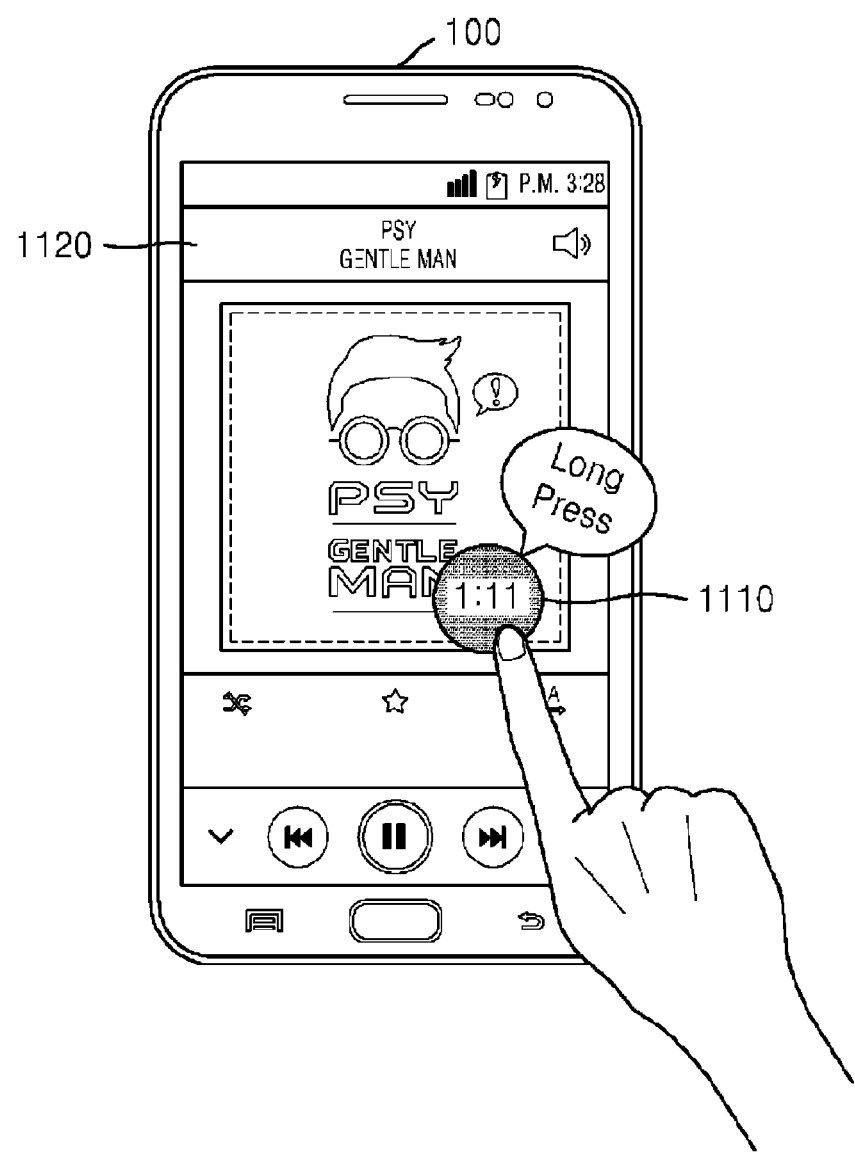
FIGS. 11A and 11B are diagrams illustrating an exemplary sharing mode cancel request.
Figure 11B:
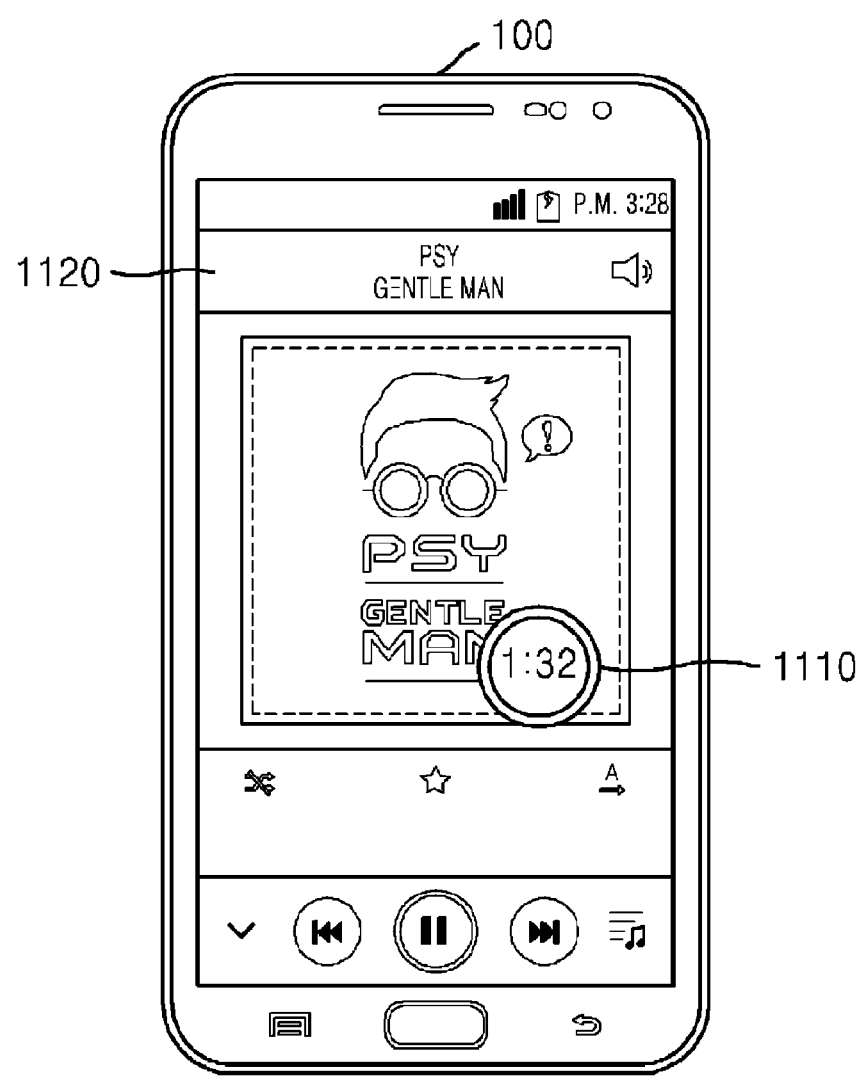

FIGS. 11A and 11B illustrate an example of a sharing mode cancel request, according to an exemplary embodiment of the present disclosure. In the exemplary embodiment of FIGS. 11A and 11B, it is assumed that a first application is a call application, and a second application is a music reproduction application.

As illustrated in FIG. 11A, the first device 100 may display a second window 1120 that corresponds to the music reproduction application, as a background of a first window 1110 that corresponds to the call application.

Here, the first device 100 is in the sharing mode, and the first window 1110 may indicate that a current operation mode of the first device 100 is the sharing mode. Also, predetermined music content may be reproduced via the application displayed in the second window 1120, and transmitted to the second device 200 via the first application.

The first device 100 may receive the sharing mode cancel request via the first window 1110. For example, a user may touch the first window 1110 that indicates the sharing mode for more than a predetermined time (e.g., over 2 seconds).

As illustrated in FIG. 11B, in response to the sharing mode cancel request, the first device 100 may stop transmitting the music content to the second device 200. Here, the first device 100 may indicate cancellation of the sharing mode by changing a shape or a color of the first window 1110. For example, the first window 1110 may be displayed as a blue color during the sharing mode, and after the sharing mode has been cancelled, the color may be changed to a white color during the normal mode.

Hereinafter, a method of receiving data transmitted from the first device 100, the method performed by the second device 200, will be described in detail with reference to FIG. 12.

Figure 12:
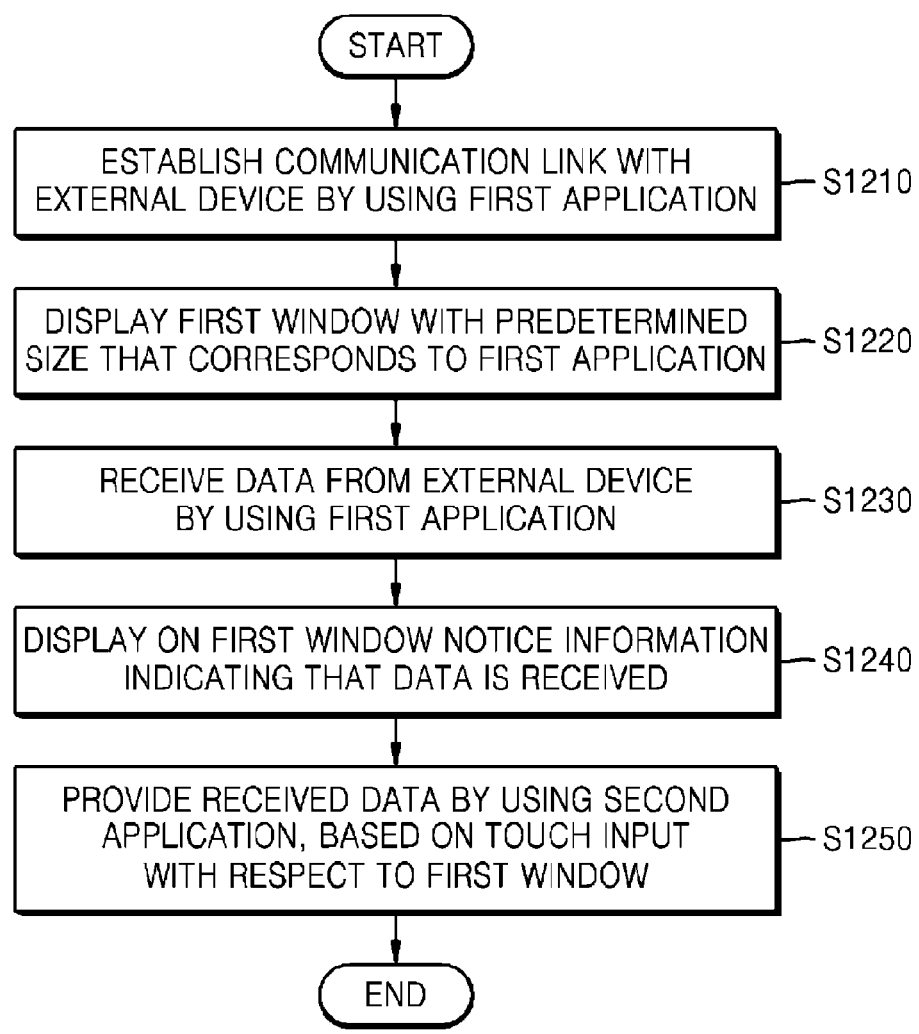
FIG. 12 is a flowchart illustrating an exemplary method of receiving data.

FIG. 12 is a flowchart illustrating a method of receiving data, according to an exemplary embodiment of the present disclosure.

In operation S1210, the second device 200 may establish a communication link with an external device by using a first application. For example, the second device 200 may establish the communication link with the first device 100 by using the first application.

In the present exemplary embodiment, the first application may be an application for establishing the communication link. For example, the first application may be, but is not limited to, a voice call application, a moving picture call application, a messenger application, or a data transmission application. Hereinafter, for convenience of description, it is assumed that the first application is the voice call application.

In the present exemplary embodiment, the second device 200 may establish the communication link. For example, the second device 200 may establish a mobile communication link by using a call application. Also, the second device 200 may establish a short-range communication link (e.g., Wi-Fi, Bluetooth, BLE, ANT+, etc.) by using the data transmission application.

In the present exemplary embodiment, the second device 200 may indirectly establish the communication link with the first device 100 via an access point, a home gateway, or a server. Also, the second device 200 may directly establish the communication link with the first device 100 via a short-range communication.

In the present exemplary embodiment, the second device 200 may transmit a communication connection request to the first device 100 by using ID information of the first device 100 (e.g., a MAC address, a Bluetooth address, a device ID, an IP address, etc.). Here, when the first device 100 responses to the communication connection request from the second device 200, the communication link may be established between the second device 200 and the first device 100.

In other exemplary embodiments, the second device 200 may receive a communication connection request from the first device 100, respond to the communication connection request from the first device 100, and thus establish a communication link with the first device 100.

In operation S1220, the second device 200 may display a first window with a predetermined size smaller than a size of a screen of the second device 200, wherein the first window corresponds to the first application.

In the present exemplary embodiment, the size or a shape of the first window may have been previously selected by a user of the second device 200. Alternatively, the size or the shape of the first window may be previously determined according to a type of the first application, at the time of generation of the first application or at the time of distribution of the first application. The second device 200 may adjust the size or the shape of the first window displayed on the screen, according to a user input.

In the present exemplary embodiment, the second device 200 may display the first window as a floating window. For example, the second device 200 may move the first window according to a drag input from the user. Also, the second device 200 may move the first window to a position at which a user's touch is sensed or to a location based on a user's voice input.

The second device 200 may display, on the first window, connection time information (e.g., 1:40) about the communication link with the first device 100.

In operation S1230, the second device 200 may receive data from an external device by using the first application. For example, the second device 200 may receive the data from the first device 100 via the communication link that is established by using the first application.

In the present exemplary embodiment, the data that is received from the first device 100 may include, but is not limited to, content that is displayed on the second window of the first device 100, content that is selected in the second window of the first device 100, and content that is reproduced via the application displayed in the second window of the first device 100.

In the present exemplary embodiment, the data received from the first device 100 may include, but is not limited to, still image content (e.g., a photo, etc.), sound content (e.g., music, an audio book, an instrument play piece, radio broadcast content, etc.), moving picture content (e.g., a TV program moving picture, VOD, a personal moving picture such as UCC, a music video, a YouTube video, etc.), text content (e.g., an electronic book, a letter, a work file, etc.), and webpage content.

In operation S1240, the second device 200 may display notice information on the first window indicating that the data is received from the external device. For example, when data is received from the first device 100, the second device 200 may display notice information indicating the type of received data, the number of pieces of received data, or other information on the first window. Alternatively, the second device 200 may visually indicate that the data has been received from the first device 100 by changing a shape, a color, brightness, or a chroma of the first window.

In operation S1250, the second device 200 may, in response to a touch input, provide the received data via the second application. For example, when the second device 200 receives the touch input with respect to the first window, the second device 200 may execute the second application related to the data received from the first device 100. Then, the second device 200 may provide the data received from the first device 100, by using the second application.

In the present exemplary embodiment, the second device 200 may display the data received from the first device 100, on the second window that corresponds to the second application. Also, the second device 200 may reproduce music content or moving picture content received from first device 100, by using the second application.

Hereinafter, with reference to FIGS. 13 through 15, an example where the second device 200 provides received data will be described in detail.

Figure 13:
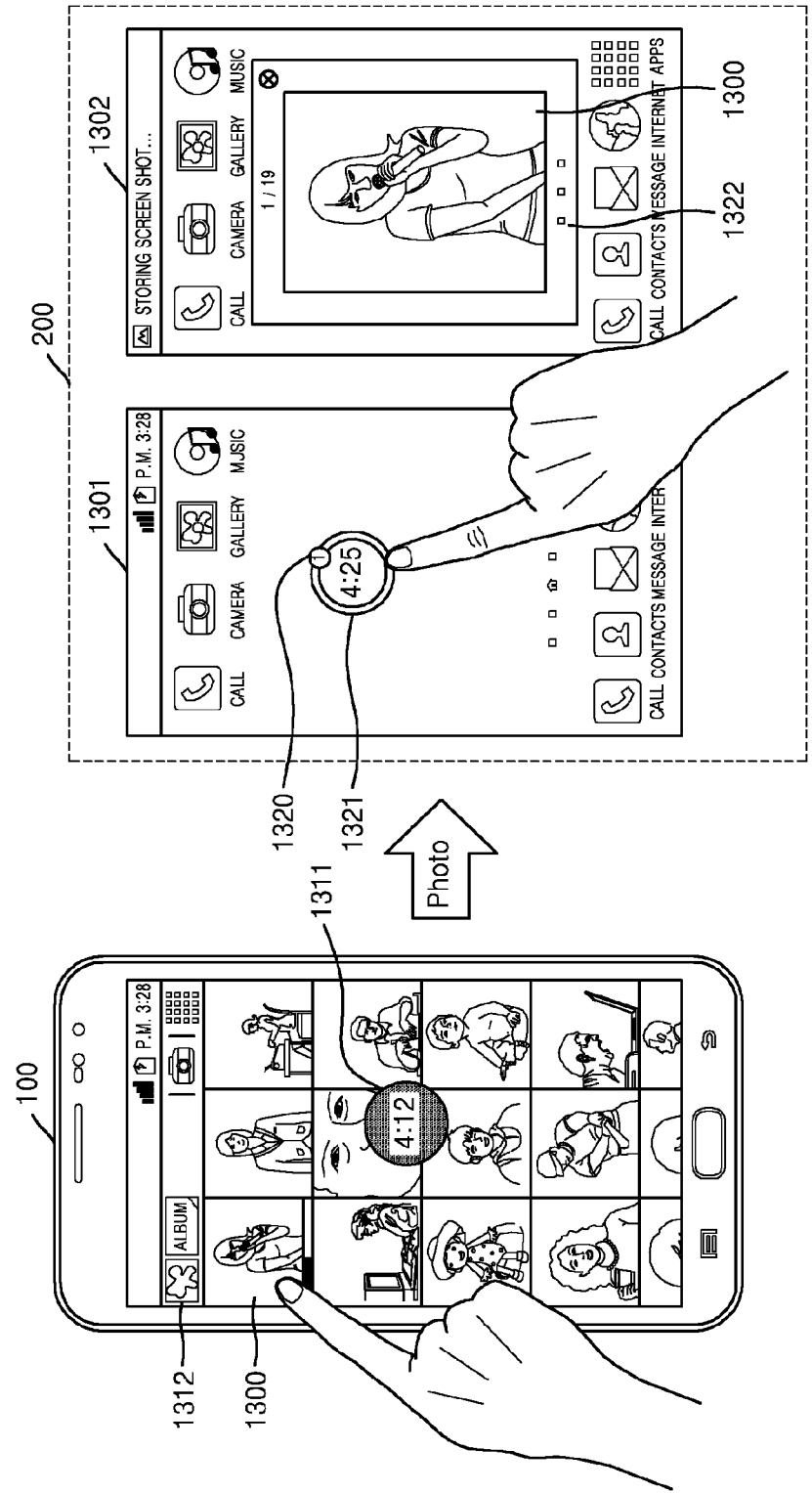
FIG. 13 is a diagram illustrating an exemplary device receiving photo content.

FIG. 13 illustrates an example of a device receiving photo content, according to an exemplary embodiment of the present disclosure.

In the present exemplary embodiment, the first device 100 may establish a communication channel with the second device 200. Then, the first device 100 may receive a sharing mode request from a user via a floating first window 1311, and may set the operation mode of the first device 100 to a sharing mode. While operating in the sharing mode, the first device 100 may receive user's selection of at least one piece of photo content 1300 displayed on the second window 1312. Here, the first device 100 may transmit the user-selected photo content 1300 to the second device 200 via the communication channel.

Referring to a first screen 1301 of the second device 200, when the second device 200 receives the photo content 1300 from the first device 100, the second device 200 may display, on a first window 1321, notice information 1320 indicating that content has been received. The number (e.g., 1) of pieces of the received photo content 1300 may be displayed as the notice information 1320 on the first window 1321. The first window 1321 may be an execution window of a call application.

The second device 200 may receive a touch input corresponding to the first window 1321 whereon the notice information 1320 is displayed. In this case, the second device 200 may execute a second application (e.g., a photo management application) that corresponds to the photo content 1300.

For example, referring to a second screen 1302 of the second device 200, the second device 200 may display the photo content 1300 on the second window 1322 that corresponds to the photo management application.

In the present exemplary embodiment, a user of the second device 200 may receive and view photo content that is transmitted by the user of the first device 100 during a phone conversation between the user of the second device 200 and the user of the first device 100.

Figure 14:
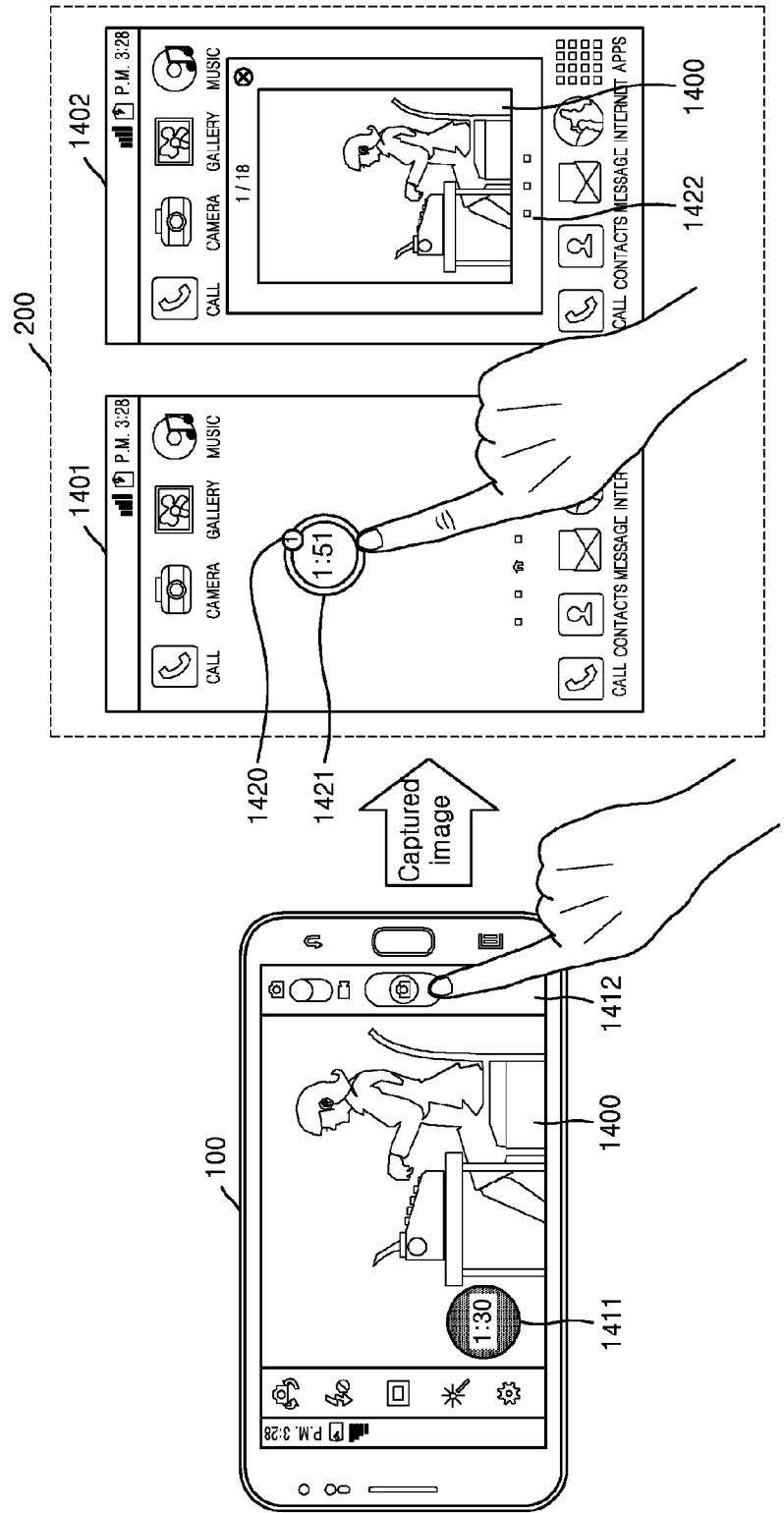
FIG. 14 is a diagram illustrating an exemplary device receiving a captured image in real-time.

FIG. 14 illustrates an example, according to an exemplary embodiment of the present disclosure, of a device receiving, in real-time, a captured image.

In the present exemplary embodiment, the first device 100 may establish a communication channel with the second device 200. Then, the first device 100 may receive a sharing mode request from a user via a floating first window 1411, and may set the operation mode of the first device 100 to the sharing mode. While operating in the sharing mode, the user may capture an external image by using a second window 1412. Here, the first device 100 may transmit a captured image 1400 to the second device 200 via the communication channel in real-time.

Referring to a first screen 1401 of the second device 200, when the second device 200 receives the captured image 1400 from the first device 100, the second device 200 may display notice information 1420 (e.g., 1) indicating that the captured image 1400 is received on a first window 1421. The first window 1421 may be a floating window that corresponds to a call application.

The second device 200 may receive a touch input corresponding to the first window 1421 whereon the notice information 1420 is displayed. In this case, the second device 200 may execute a second application that corresponds to the captured image 1400 (e.g., a photo management application). For example, referring to a second screen 1402 of the second device 200, the second device 200 may display the captured image 1400 on a second window 1422 that is an execution window of the photo management application.

In the present exemplary embodiment, during an ongoing call between a user of the first device 100 and a user of the second device 200, the user of the first device 100 may transmit in real-time, an image captured by using a camera application, to the second device 200. Here, during the phone conversation, the user of the second device 200 may receive and view, in real-time, the image captured by the user of the first device 100.

Figure 15:
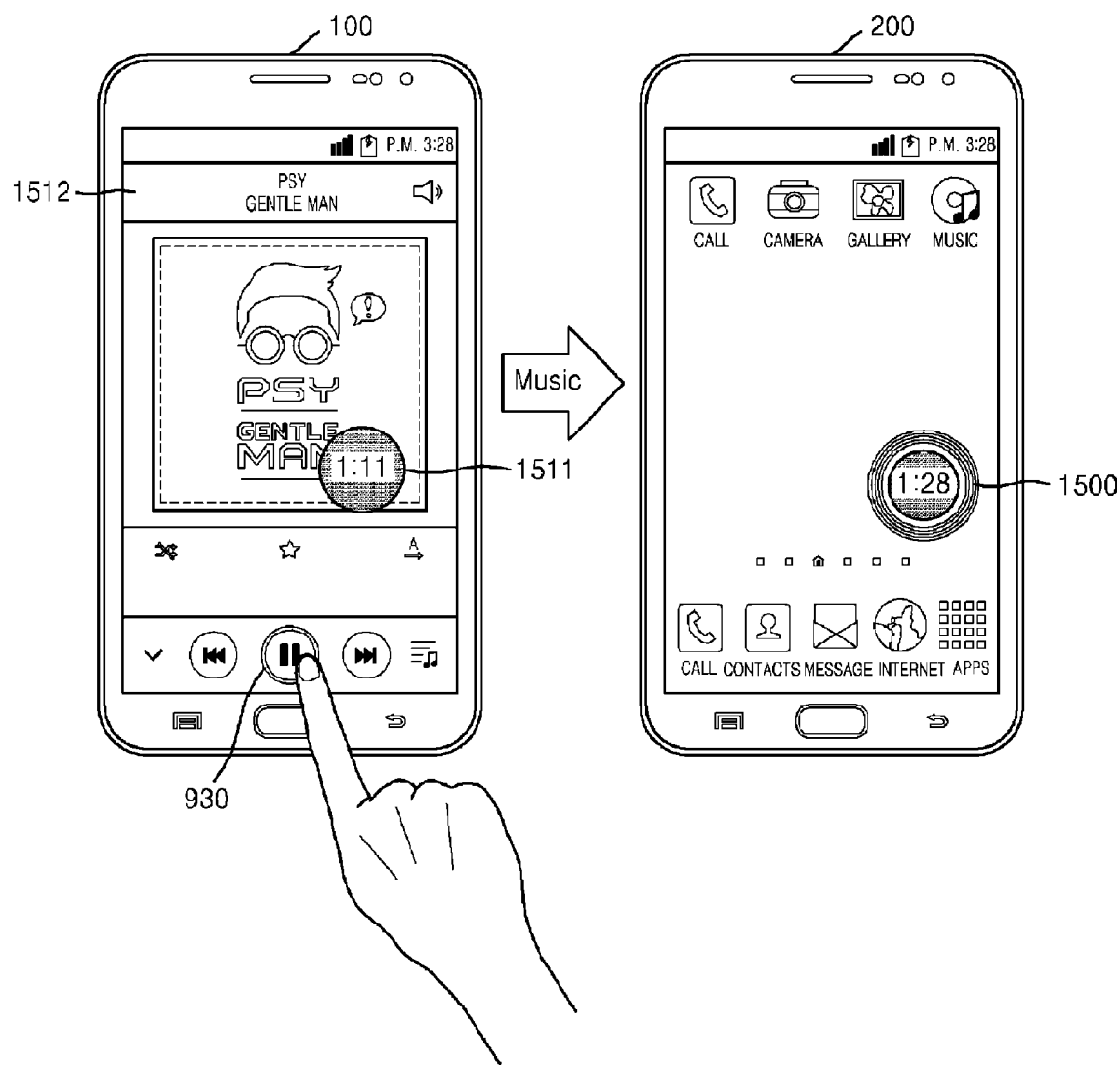
FIG. 15 is a diagram illustrating an exemplary device receiving music content.

FIG. 15 illustrates an example of a device receiving music content, according to an exemplary embodiment of the present disclosure.

In the present exemplary embodiment, the first device 100 may establish a communication channel with the second device 200. Then, the first device 100 may receive a sharing mode request from a user via a floating first window 1511, and may set the operation mode of the first device 100 to the sharing mode. While operating in the sharing mode, the user may transmit the music content that is reproduced in the second window 1512, to the second device 200 via the communication channel in real-time. For example, while operating in the sharing mode, the music content may be transmitted from the first device 100 to the second device 200 in a streaming manner from a point of time when the user of the first device 100 selects a media control button.

When the second device 200 receives the music content from the first device 100, the second device 200 may reproduce the received music content. For example, the second device 200 may execute a music reproduction application and may reproduce the received music content by using the music reproduction application. Also, the second device 200 may display, on a first window 1500, notice information indicating that the content has been received. The first window 1500 may be a floating window that corresponds to an execution screen of a call application.

Accordingly, in the present exemplary embodiment, a user of the first device 100 and a user of the second device 200 may listen to same music content during a phone conversation.

Figure 16:
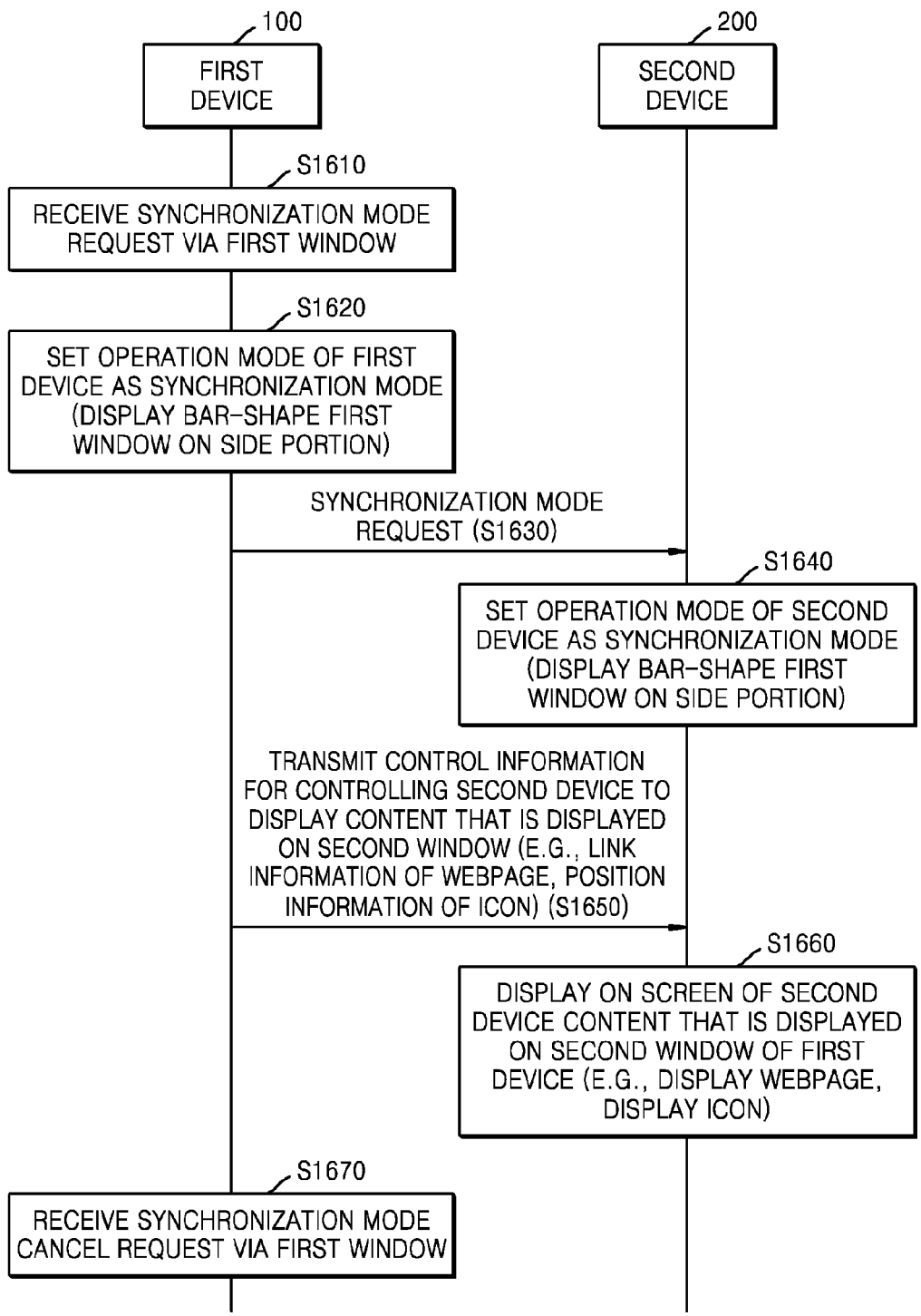
FIG. 16 is a flowchart illustrating an exemplary method of operating during a synchronization mode.

FIG. 16 is a flowchart illustrating a method of operating in a synchronization mode. According to an exemplary embodiment of the present disclosure, the method may be performed by a device.

In operation S1610, the first device 100 may receive a synchronization mode request via an input corresponding to a floating first window. The synchronization mode may be used to indicate an operating mode in which the first device 100 remotely controls the second device 200. This allows content displayed on a second window of the first device 100, to also be displayed on a screen of the second device 200.

In the present exemplary embodiment, the synchronization mode request may vary. For example, the first device 100 may receive a drag input of dragging the first window to a portion of the screen (e.g., an upper portion, a lower portion, a left portion, a right portion, a corner, etc.), as the synchronization mode request.

In operation S1620, in response to the synchronization mode request, the first device 100 may set an operation mode of the first device 100 as the synchronization mode. In the present exemplary embodiment, in order to indicate the synchronization mode, the first device 100 may change a shape of the first window to a bar shape, and may display the bar-shaped first window on a side portion of the screen. Here, the bar-shaped first window may be fixed at the side portion of the screen.

In operation S1630, the first device 100 may transmit, via an established communication link, the synchronization mode request to the second device 200. Here, the second device 200 may receive the synchronization mode request and may transmit a message to the first device 100 in response to the synchronization mode request.

In operation S1640, in response to the synchronization mode request from the first device 100, the second device 200 may also set an operation mode of the second device 200 as the synchronization mode. In order to indicate the synchronization mode, the second device 200 may also change a shape of a first window of the second device 200 to a bar shape, and may display the bar-shaped first window on a side portion of a screen of the second device 200.

In operation S1650, the first device 100 may transmit control information to the second device 200 via the communication link. The control information controls the second device 200 to display the content that is displayed on the second window of the first device 100. Here, the first device 100 may transmit link information of a webpage (e.g., a Uniform Resource Locator (URL)), position information about an icon, or the like to the second device 200.

In operation S1660, the second device 200 may display a webpage that is the same as the webpage displayed on the second window of the first device 100, by using the link information (e.g., the URL) of the webpage that is received from the first device 100. Also, the second device 200 may display an icon at the same position as the first device 100, by using the position information about the icon that is received from the first device 100.

In operation S1670, the first device 100 may receive a synchronization mode cancel request via an input corresponding to the first window. In the present exemplary embodiment, the synchronization mode cancel request may vary. For example, the first device 100 may receive, as the synchronization mode cancel request, a user input of inwardly dragging the bar-shape first window that is displayed on the side portion of the screen.

According to the present exemplary embodiment, the first device 100 may change the operation mode of the first device 100 from the synchronization mode to a normal mode. Then, the first device 100 may no more transmit the control information including the link information of the webpage, the position information about the icon, or the like to the second device 200.

In the present exemplary embodiment, the first device 100 may display an indicator indicating the normal mode on the first window. For example, the first window may be displayed with a round shape during the normal mode. Also, in order to indicate that the operation mode is changed from the synchronization mode to the normal mode, the first device 100 may change a color, brightness, or a chroma of the first window, or may change a color or a thickness of edge lines of the first window.

In other exemplary embodiments, an order of operations S1610 through S1670 may be changed or some operations may be skipped.

Figure 17:
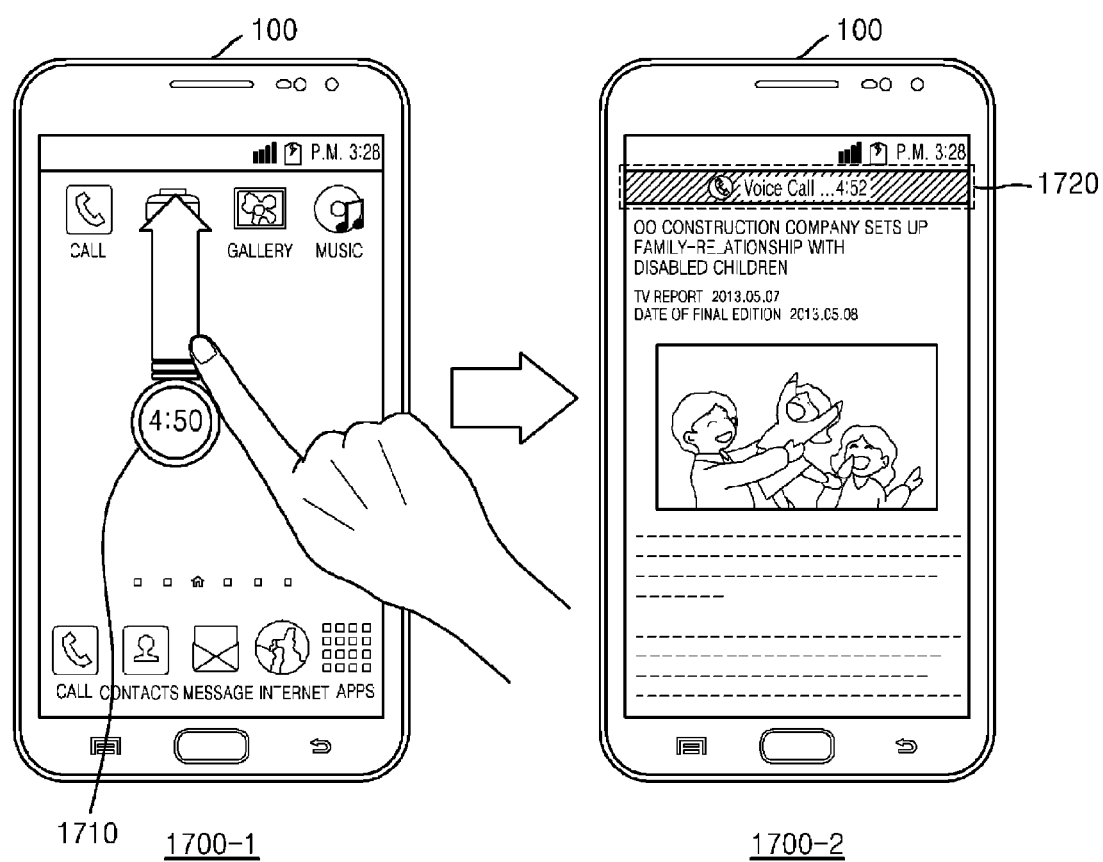
FIG. 17 is a diagram illustrating an exemplary device setting a synchronization mode.

FIG. 17 illustrates an example of a device setting a synchronization mode, according to an exemplary embodiment of the present disclosure.

As illustrated in 1700-1, the first device 100 may receive a drag input of dragging a first window 1710, displayed in the form of floating window, to an upper portion of a screen. Here, the first device 100 may recognize the drag input as a synchronization mode request. In response to the synchronization mode request, the first device 100 may set an operation mode of the first device 100 as a synchronization mode.

As illustrated in 1700-2, in response to the drag input by a user, the first device 100 may change a shape of a first window 1720 to a bar shape, and may display the bar-shaped first window 1720 on the upper portion of the screen. Here, a call connection time may be continuously displayed on the bar-shaped first window 1720.

In the present exemplary embodiment, the first device 100 may execute a web browser and the web browser may display a webpage. Then, link information corresponding to the webpage displayed on the web browser may be transmitted from the first device 100 to the second device 200. Thus, screens of the first device 100 and the second device 200 may be synchronized.

Figure 18:
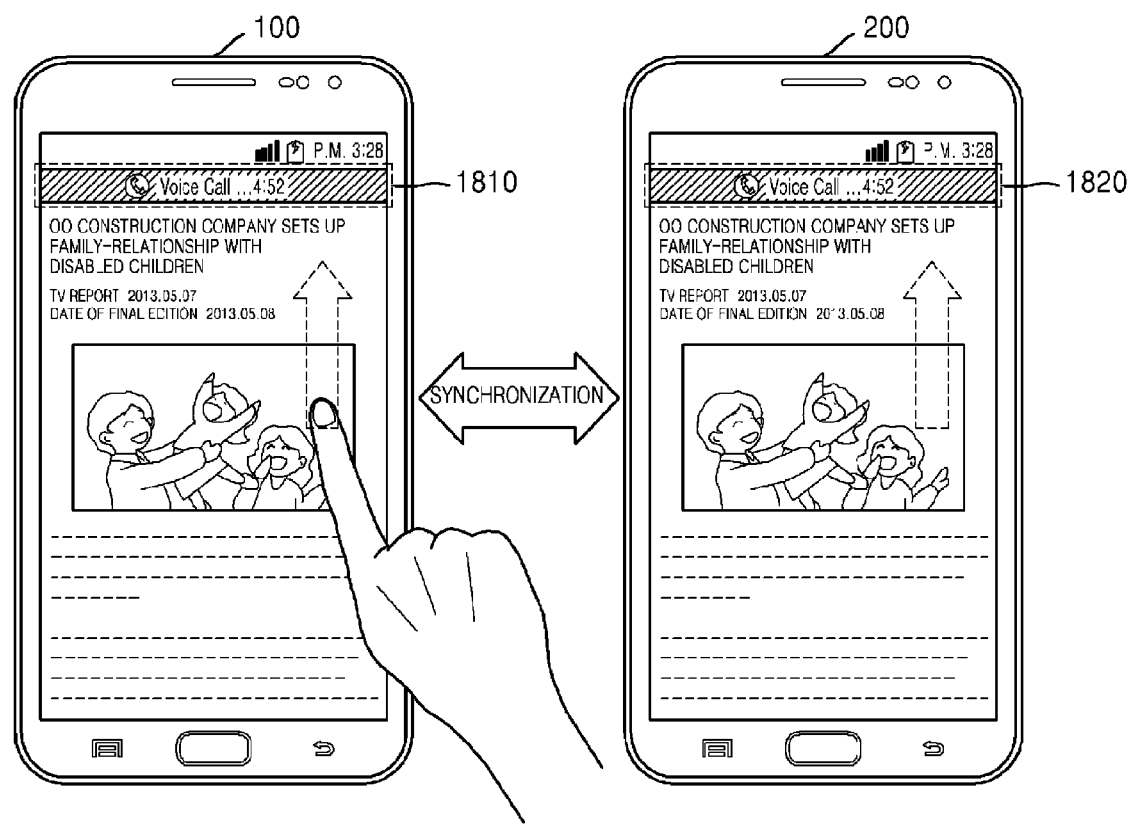
FIG. 18 is a diagram illustrating an exemplary device synchronizing a screen, whereon a webpage is displayed, with a screen of an external device.

FIG. 18 illustrates an example of a device displaying a webpage, and synchronizing the display with a screen of an external device, according to an exemplary embodiment of the present disclosure.

As illustrated in FIG. 18, the first device 100 operating in a synchronization mode, may transmit link information of the webpage displayed on the web browser to the second device 200. Here, based on the link information, the second device 200 may display a webpage that is the same as the webpage displayed on the first device 100.

For example, when a user of the first device 100 changes the webpage displayed on the web browser to a changed webpage, the first device 100 may transmit link information about the changed webpage to the second device 200 and thus may control the second device 200 to display the changed webpage.

In order to indicate the synchronization mode, the first device 100 and the second device 200 may display bar-shaped first windows 1810 and 1820, which correspond to execution screens of a call application, on upper portions of the respective screen.

Figure 19:
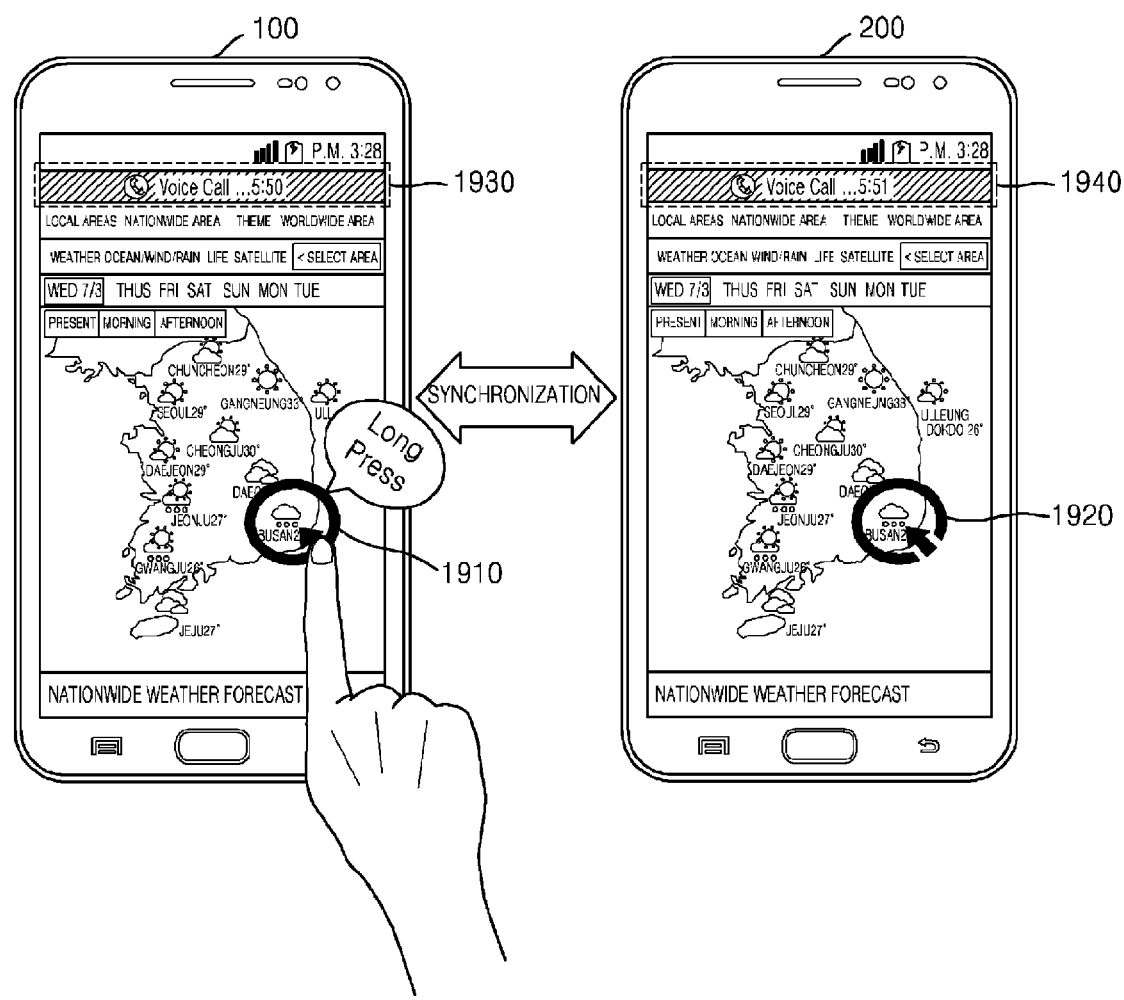

FIG. 19 illustrates an example of a device synchronizing display of an icon with an external device in, according to an exemplary embodiment of the present disclosure.

As illustrated in FIG. 19, the first device 100 operating in a synchronization mode, may transmit link information of a webpage that is displayed on a web browser to the second device 200. Here, based on the link information, the second device 200 may display the same webpage as the webpage displayed on the first device 100.

Also, the first device 100 may receive a touch input of touching a specific point of the webpage (e.g., Busan) for more than a predetermined time. In this case, the first device 100 may display a predetermined icon 1910 at the specific point (e.g., Busan), and may transmit position information (e.g., a coordinate value) of the predetermined icon 1910 to the second device 200.

The second device 200 may display an icon 1920 at a corresponding position (e.g., Busan) based on the position information (e.g., the coordinate value) of the predetermined icon 1910. The icon 1920 may be the same as the predetermined icon 1910 displayed on the first device 100.

In order to indicate the synchronization mode, the first device 100 and the second device 200 may display bar-shaped first windows 1930 and 1940 that are execution windows of a call application on upper portions of the respective screen.

In the present exemplary embodiment, a user of the first device 100 and a user of the second device 200 may continue talking via the call application while the users watch the same webpage or same icon on the respective screens.

Figure 20:
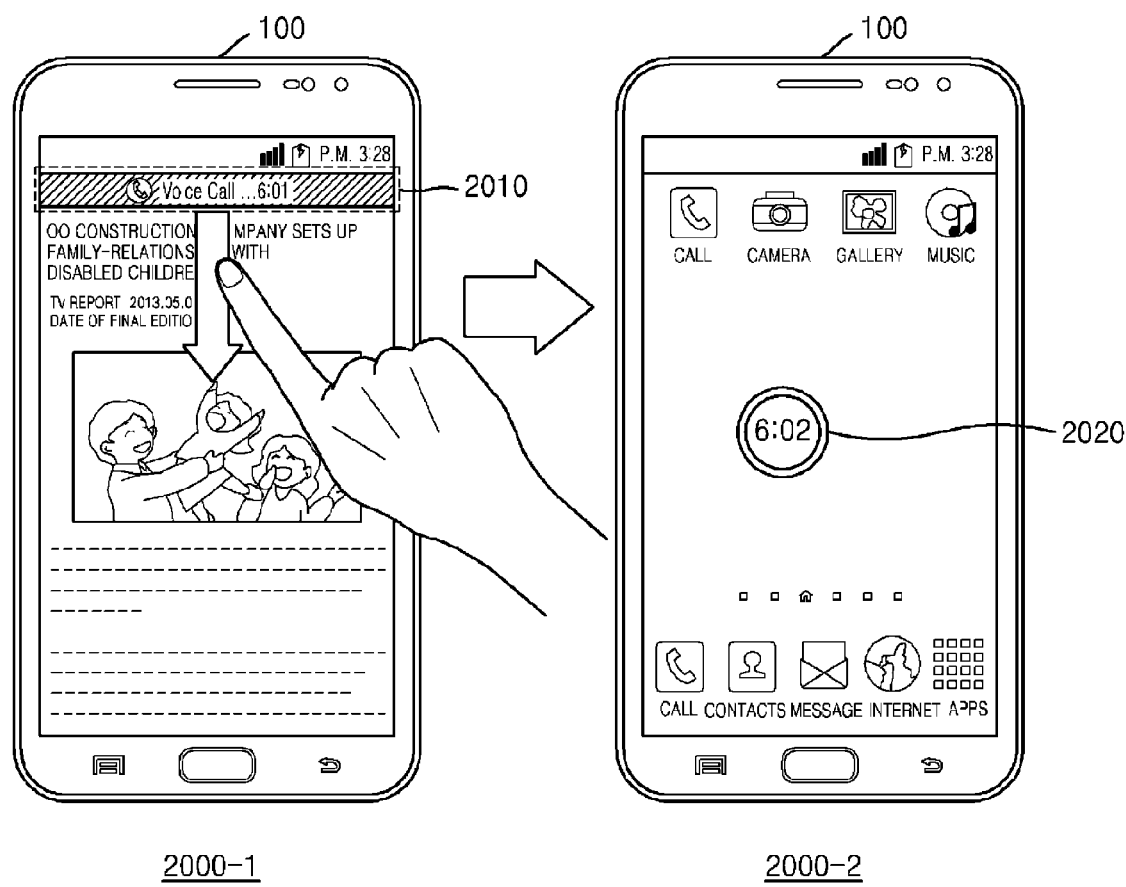
FIG. 20 is a diagram illustrating an exemplary device receiving a synchronization mode cancel request.

FIG. 20 illustrates an example of receiving a synchronization mode cancel request, according to an exemplary embodiment of the present disclosure.

As illustrated in 2000-1, the first device 100 may receive an input of inwardly dragging a bar-shaped first window 2010 that is displayed on an upper portion. Here, the user's drag input may indicate a synchronization mode cancel request.

As illustrated in 2000-2, the first device 100 may change the bar-shape first window 2010 to a circular-shaped floating first window 2020. Then, the first device 100 may change its operation mode from a synchronization mode to a normal mode. Since the synchronization mode is cancelled, the first device 100 may no longer transmit control information, such as information of a webpage, position information about an icon, or the like to the second device 200.

Figure 21:
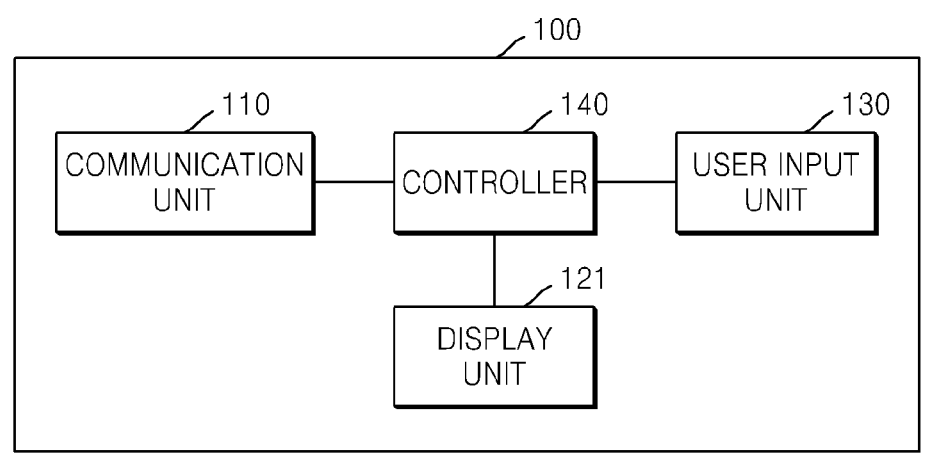
FIGS. 21 and 22 are block diagrams illustrating structures of an exemplary first device.
Figure 22:
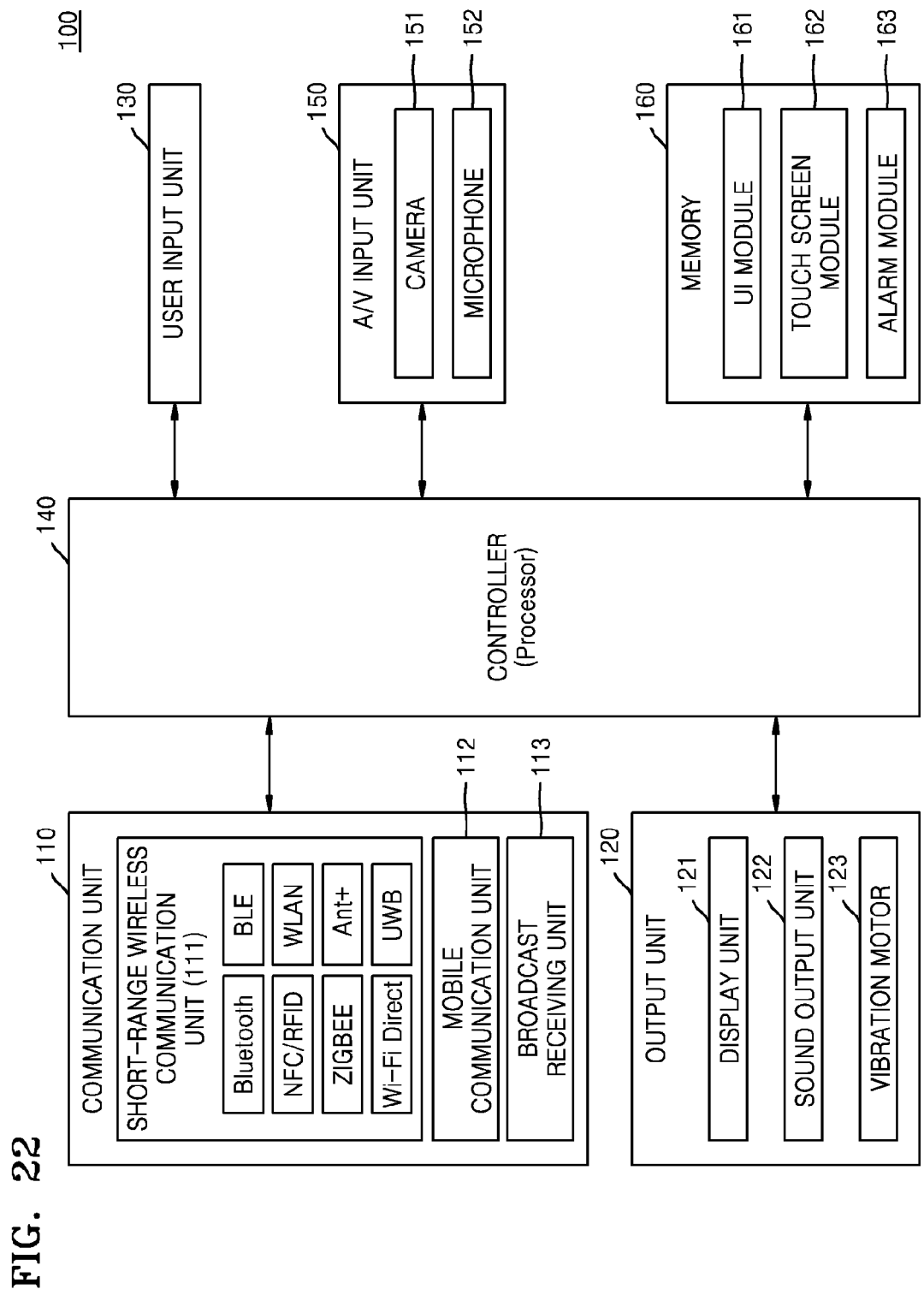

FIGS. 21 and 22 are block diagrams illustrating exemplary structures of the first device 100, according to aspects of various exemplary embodiments of the present disclosure.

As illustrated in FIG. 21, the first device 100 may include a communication unit 110, a display unit 121, a user input unit 130, and a controller 140. However, not all shown elements are necessary. That is, the first device 100 may be embodied with more or less elements than the shown elements.

For example, as illustrated in FIG. 22, the first device 100 may include the communication unit 110, an output unit 120, the user input unit 130, the controller 140 (also, referred to as a processor 140), an audio/moving picture (A/V) input unit 150, and a memory 160.

Hereinafter, the elements will be described.

The communication unit 110 may include one or more elements allowing communication between the first device 100 and the second device 200 or between the first device 100 and a server. For example, the communication unit 110 may include a short-range wireless communication unit 111, a mobile communication unit 112, and a broadcast receiving unit 113.

The short-range wireless communication unit 111 may include, but is not limited to, a Bluetooth communication unit, a BLE communication unit, a Near Field Communication (NFC) unit, a WLAN (Wi-Fi) communication unit, a ZigBee communication unit, an IrDA communication unit, a WFD communication unit, a UWB communication unit, or an Ant+ communication unit.

The mobile communication unit 112 exchanges a wireless signal with at least one of a base station, an external terminal, and a server on a mobile communication network. The wireless signal may include various types of data according to communication of a sound call signal, a moving picture call signal, or a text/multimedia message.

The broadcast receiving unit 113 receives a broadcast signal and/or information related to a broadcast from the outside through a broadcast channel. The broadcast channel may include a satellite channel and a ground wave channel. In other exemplary embodiments, the first device 100 may not include the broadcast receiving unit 113.

The output unit 120 may function to output an audio signal, a video signal, or a vibration signal and may include a display unit 121, a sound output unit 122, a vibration motor 123, or the like.

The display unit 121 displays and outputs information that is processed in the first device 100. For example, the display unit 121 may display a first window corresponding to a first application, the first window having a predetermined size smaller than a size of a screen. In response to an execution request with respect to a second application that is different from the first application, the display unit 121 may display a second window corresponding to the second application, as a background of the first window.

The display unit 121 may display various indicators on the first window in order to indicate a sharing mode, a normal mode, or a synchronization mode. For example, the display unit 121 may display the first window having a shape, a color, or a chroma corresponding to a particular mode.

A touch screen may be implemented by forming the display unit 121 and a touch pad so as to have a mutual layer structure, allowing the display unit 121 to be used as both an output device and input device. The display unit 121 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. Also, according to a type of the first device 100, the first device 100 may include at least two display units 121.

The sound output unit 122 may output audio data that is received from the communication unit 110 or is stored in the memory 160. The sound output unit 122 may also output a sound signal (e.g., a call signal receiving sound, a message receiving sound, a notifying sound, or the like) related to capabilities performed by the first device 100. The sound output unit 122 may include a speaker, a buzzer, or the like.

The vibration motor 123 may output a vibration signal. For example, the vibration motor 123 may output the vibration signal in concert with an output of the audio data (e.g., the call signal receiving sound, the message receiving sound, or the like) or video data. Also, the vibration motor 123 may output a vibration signal when a touch is input to the touch screen.

The user input unit 130 may be a unit by which a user inputs data so as to control the first device 100. For example, the user input unit 130 may include one or more of a key pad, a dome switch, a touch capacitive type touch pad, a pressure resistive type touch pad, an infrared beam sensing type touch pad, a surface acoustic wave type touch pad, an integral strain gauge type touch pad, a piezo effect type touch pad, any other type of touch pad, a jog wheel, and a jog switch. As one having ordinary skill in the art would appreciate, one or more embodiments are not limited thereto.

The user input unit 130 may receive a sharing mode request via an input corresponding to the first window. For example, the user input unit 130 may receive, as the sharing mode request, a user input of touching the first window for more than a predetermined time. As one having ordinary skill in the art would appreciate, one or more embodiments are not limited thereto, and any input may be used to request the sharing mode.

The user input unit 130 may receive a sharing mode cancel request via an input corresponding to the first window. Also, the user input unit 130 may receive a movement request with respect to the first window.

The user input unit 130 may receive a synchronization mode request via an input corresponding to the first window. For example, the user input unit 130 may receive, as the synchronization mode request, a drag input of dragging the first window to a portion of the screen. As one having ordinary skill in the art would appreciate, one or more embodiments are not limited thereto and any input may be used to request the synchronization mode.

The controller 140 may generally control all operations of the first device 100. That is, the controller 140 may control the communication unit 110, the output unit 120, the user input unit 130, the A/V input unit 150, etc. by executing programs stored in the memory 160.

In response to the sharing mode request, the controller 140 may set an operation mode of the first device 100 to the sharing mode. Then, the controller 140 may control the communication unit 110 to transmit data provided from the second application to the second device 200 via a communication link.

In response to the sharing mode cancel request, the controller 140 may stop transmitting the data to the second device 200. Also, in response to the movement request, the controller 140 may move the first window.

In response to the synchronization mode request, the controller 140 may set the operation mode of the first device 100 to the synchronization mode, and may control the communication unit 110 to transmit control information to the second device 200 via the communication link, wherein the control information controls the second device 200 to display content that is displayed on the second window.

The controller 140 may control the communication unit 110 to transmit at least one of webpage link information and icon position information, the webpage and icon being displayed on the second window, to the second device 200 via the communication link.

The controller 140 may capture an image of the content displayed on the second window, and may control the communication unit 110 to transmit the captured image of the content to the second device 200 via the communication link.

The controller 140 may change a shape of the first window to a bar shape and display the bar-shaped first window on a portion of the screen while operating in the synchronization mode.

The A/V input unit 150 may receive an input of an audio signal or a video signal and may include a camera 151 and a microphone 152. The camera 151 may obtain an image frame such as a still image or a moving picture via an image sensor during a moving picture call mode or an image-capturing mode. An image that is captured via the image sensor may be processed by the controller 140 or a separate image processor (not shown).

The image frame that is processed by the camera 151 may be stored in the memory 160 or may be transmitted to an external source via the communication unit 110. According to various exemplary embodiments, the first device 100 may include two or more cameras 151.

The microphone 152 may receive an external sound signal as an input, and process the received sound signal to an electrical voice data signal. For example, the microphone 152 may receive a sound signal from an external device or a speaker. In order to remove noise that occurs while the sound signal is externally input, various noise removing algorithms may be used.

The memory 160 may store a program for processing and controlling the controller 140, or may store a plurality of pieces of input/output data (e.g., an application, content, ID information of an external device, an address book, etc.).

The memory 160 may include a storage medium of at least one type of a flash memory, a hard disk, a multimedia card type memory, a card type memory such as an SD or XD card memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc. Also, the first device 100 may run web storage or a cloud server that performs a storage function of the memory 160 on the Internet.

The programs stored in the memory 160 may be classified into a plurality of modules according to their functions. For example, the programs stored in the memory 160 may be classified into a UI module 161, a touch screen module 162, an alarm module 163, etc.

The UI module 161 may provide a specialized UI or GUI in connection with the first device 100 for each application. The touch screen module 162 may detect a user's touch gesture on the touch screen and transmit information corresponding to the touch gesture to the controller 140. The touch screen module 162 may recognize and analyze a touch code. The touch screen module 162 may be configured by additional hardware such as a controller.

Various sensors may be arranged in or near the touch screen so as to detect a touch or a proximate touch on the touch sensor.

An exemplary sensor to detect the touch may include a tactile sensor. The tactile sensor may detect a contact of a specific object. The tactile sensor may detect various types of information such as the coarseness of a contact surface, the hardness of the contact object, the temperature of a contact point, or the like.

An exemplary sensor to detect the touch on the touch screen may include a proximity sensor. The proximity sensor may detect the presence of an object that approaches, or exists close to a predetermined detection surface by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like.

The touch gesture may include a tap gesture, a touch & hold gesture, a double tap gesture, a drag gesture, a panning gesture, a flick gesture, a drag & drop gesture, a swipe gesture, or the like.

The alarm module 163 in the first device 100 may generate a signal for notifying the user about an occurrence of an event. Examples of the event include a call signal receiving event, a message receiving event, a key signal input event, a schedule notifying event, or the like. The alarm module 163 may output an alarm signal in the form of a video signal via the display unit 121, an audio signal via the sound output unit 122, or a vibration signal via the vibration motor 123.

Figure 23:
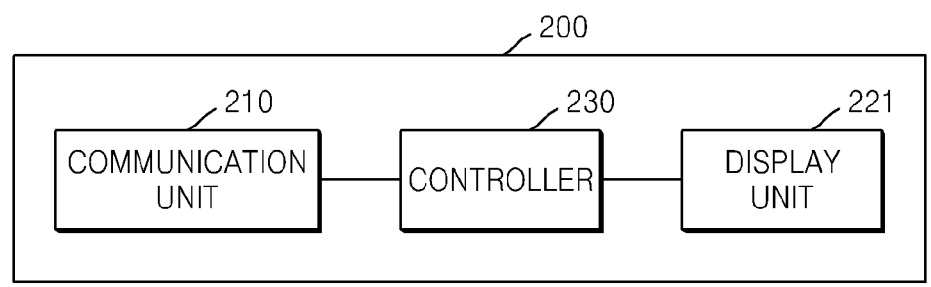
FIGS. 23 and 24 are block diagrams illustrating structures of an exemplary second device.
Figure 24:
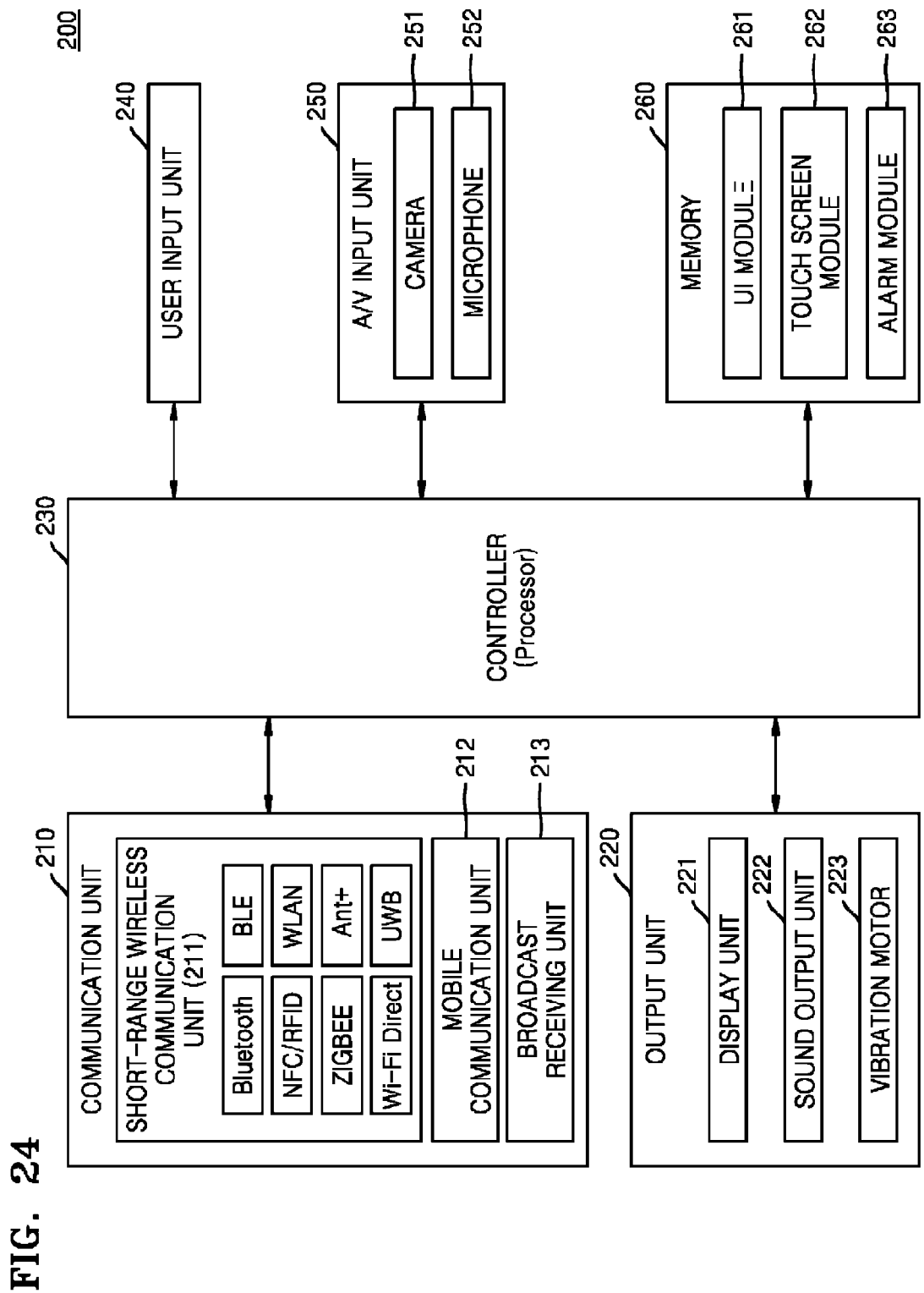

FIGS. 23 and 24 are block diagrams illustrating structures of the second device 200, according to exemplary embodiments of the present disclosure.

As illustrated in FIG. 23, the second device 200 may include a communication unit 210, a controller 230, and a display unit 221. However, not all shown elements are necessary elements. That is, the second device 200 may be embodied with more or less elements than the shown elements.

For example, as illustrated in FIG. 24, the second device 200 may include the communication unit 210, a output unit 220, the controller 230 (also, referred to as a processor 230), a user input unit 240, an A/V input unit 250, and a memory 260.

Hereinafter, the elements will be described.

The communication unit 210 may include one or more elements allowing communication between the second device 200 and the first device 100 or between the second device 200 and a server. For example, the communication unit 210 may include a short-range wireless communication unit 211, a mobile communication unit 212, and a broadcast receiving unit 213.

The short-range wireless communication unit 211 may include, but is not limited to, a Bluetooth communication unit, a BLE communication unit, an NFC unit, a WLAN (Wi-Fi) communication unit, a ZigBee communication unit, an IrDA communication unit, a WFD communication unit, a UWB communication unit, or an Ant+ communication unit.

The mobile communication unit 212 exchanges a wireless signal with at least one of a base station, an external terminal, and a server on a mobile communication network. The wireless signal may include various types of data according to communication of a sound call signal, a moving picture call signal, or a text/multimedia message.

The broadcast receiving unit 213 receives a broadcast signal and/or information related to a broadcast from the outside through a broadcast channel. The broadcast channel may include a satellite channel and a ground wave channel. In other exemplary embodiments, the second device 200 may not include the broadcast receiving unit 213.

The communication unit 210 may establish a communication link with an external device by using a first application, and may receive data from the external device by using the first application.

The output unit 220 may function to output an audio signal, a video signal, or a vibration signal and may include a display unit 221, a sound output unit 222, a vibration motor 223, or the like.

The display unit 221 displays and outputs information that is processed in the second device 200. For example, the display unit 221 may display a first window corresponding to a first application, the first window having a predetermined size smaller than a size of a screen of the second device 200 and may display notice information indicating the reception of data from the external device.

A touch screen may be implemented by forming the display unit 221 and a touch pad so as to have a mutual layer structure, allowing the display unit 221 to be used as both an output device and input device. The display unit 221 may include at least one of an LCD, a TFT-LCD, an OLED display, a flexible display, a 3D display, and an electrophoretic display. Also, according to a type of the second device 200, the second device 200 may include at least two display units 221.

The sound output unit 222 may output audio data that is received from the communication unit 210 or is stored in the memory 260. The sound output unit 222 may also output a sound signal (e.g., a call signal receiving sound, a message receiving sound, a notifying sound, or the like) related to capabilities performed by the second device 200. The sound output unit 222 may include a speaker, a buzzer, or the like.

The vibration motor 223 may output a vibration signal. For example, the vibration motor 223 may output the vibration signal in concert with an output of the audio data (e.g., the call signal receiving sound, the message receiving sound, or the like) or video data. Also, the vibration motor 223 may output a vibration signal when a touch is input to the touch screen.

The controller 230 may generally control all operations of the second device 200. That is, the controller 230 may control the communication unit 210, the output unit 220, the user input unit 240, the A/V input unit 250, etc. by executing programs stored in the memory 260.

The controller 230 may execute a second application related to the received data, based on the touch input with respect to the first window, and may provide the received data by using the second application.

The user input unit 240 may be a unit by which a user inputs data so as to control the second device 200. For example, the user input unit 240 may include one or more of a key pad, a dome switch, a touch capacitive type touch pad, a pressure resistive type touch pad, an infrared beam sensing type touch pad, a surface acoustic wave type touch pad, an integral strain gauge type touch pad, a piezo effect type touch pad, any other type of touch pad, a jog wheel, and a jog switch. As one having ordinary skill in the art would appreciate, one or more embodiments are not limited thereto.

The A/V input unit 250 may receive an input of an audio signal or a video signal and may include a camera 251 and a microphone 252. The camera 251 may obtain an image frame such as a still image or a moving picture via an image sensor during a moving picture call mode or an image-capturing mode. An image that is captured via the image sensor may be processed by the controller 230 or a separate image processor (not shown).

The image frame that is processed by the camera 251 may be stored in the memory 260 or may be transmitted to an external source via the communication unit 210. According to various exemplary embodiments, the second device 200 may include two or more cameras 251.

The microphone 252 may receive an external sound signal as an input, and process the received sound signal to an electrical voice data signal. For example, the microphone 252 may receive a sound signal from an external device or a speaker. In order to remove noise that occurs while the sound signal is externally input, various noise removing algorithms may be used.

The memory 260 may store a program for processing and controlling the controller 230, or may store a plurality of pieces of input/output data (e.g., an application, content, an address book, etc.).

The memory 260 may include a storage medium of at least one type of a flash memory, a hard disk, a multimedia card type memory, a card type memory such as an SD or XD card memory, a RAM, a SRAM, a ROM, an EEPROM, a PROM, a magnetic memory, a magnetic disc, and an optical disc. Also, the second device 200 may run web storage or a cloud server that performs a storage function of the memory 260 on the Internet.

The programs stored in the memory 260 may be classified into a plurality of modules according to their functions. For example, the programs stored in the memory 260 may be classified into a UI module 261, a touch screen module 262, an alarm module 263, etc.

The UI module 261 may provide a specialized UI or GUI in connection with the second device 200 for each application. The touch screen module 262 may detect a user's touch gesture on the touch screen and transmit information corresponding to the touch gesture to the controller 230. The touch screen module 262 may recognize and analyze a touch code. The touch screen module 262 may be configured by additional hardware such as a controller.

Various sensors may be arranged in or near the touch screen so as to detect a touch or a proximate touch on the touch sensor.

An exemplary sensor to detect the touch may include a tactile sensor. The tactile sensor may detect a contact of a specific object. The tactile sensor may detect various types of information such as the coarseness of a contact surface, the hardness of the contact object, the temperature of a contact point, or the like.

An example of the sensor to detect the touch on the touch screen may include a proximity sensor. The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The alarm module 263 may generate a signal for notifying the user about an occurrence of an event. Examples of the event that may occur include a call signal receiving event, a message receiving event, a key signal input event, a schedule notifying event, or the like.

One or more exemplary embodiments of the present disclosure may also be embodied as programmed commands to be executed in various computer units, and then may be recorded in a computer-readable recording medium. The computer-readable recording medium may include one or more of the programmed commands, data files, data structures, or the like. The programmed commands recorded to the computer-readable recording medium may be particularly designed or configured for one or more exemplary embodiments of the present disclosure or may be well known to one of ordinary skill in the art. Examples of the computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only machine code generated by a compiler but also include a high-level programming language to be executed in a computer by using an interpreter.

According to exemplary embodiments of the present disclosure, the device 100 and the second device 200 may provide a movable floating window having a predetermined size, so that a user may easily change an operation mode of a corresponding device and may exchange data during a phone conversation.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A method for transmitting data, performed by an electronic device, to an external device, the method comprising:
    establishing a communication link with the external device using a first application being executed in the electronic device;
    displaying, on a touch screen of the electronic device, a first window corresponding to the first application and a second window corresponding to a second application being executed in the electronic device;
    setting, an operation mode of the electronic device as a sharing mode based on a first user touch input on the first window; and
    transmitting data to the external device via the communication link, wherein the data is selected based on a second user touch input on the second window while the first window is displayed on the second window,
    wherein the first window is displayed on the second window in a state of allowing a user touch input to be received in the second window.

2. The method of claim 1, wherein the transmitted data comprises at least one from among content displayed on the second window, content selected in the second window, and content reproduced via the second application.

3. The method of claim 1, wherein the setting of the sharing mode comprises receiving the first user touch input on the first window over a predetermined time.

4. The method of claim 1, wherein the setting of the operation mode comprises displaying an indicator indicating the sharing mode on the first window.

5. The method of claim 1, further comprising:
    in response to receiving a sharing mode cancel request via the first window, discontinuing the transmitting of the data to the external device.

6. The method of claim 1, further comprising:
    in response to receiving a movement request, moving the first window.

7. The method of claim 1, further comprising:
    in response to receiving a synchronization mode request via the first window, setting the operation mode of the electronic device as a synchronization mode; and
    transmitting control information to the external device via the communication link.

8. The method of claim 7, wherein the transmitting of the control information comprises transmitting at least one from among link information corresponding to a webpage displayed on the second window and position information of an icon displayed on the second window.

9. The method of claim 7, wherein the transmitting of the control information comprises:
    capturing an image of content that is displayed on the second window; and
    transmitting the captured image to the external device via the communication link.

10. An electronic device comprising:
a communication unit configured to establish a communication link with an external device by using a first application being executed in the electronic device;
a display unit configured to display, on a touch screen of the electronic device, a first window that corresponds to the first application, and a second window that corresponds to a second application being executed in the electronic device;
a user input unit; and
a controller configured to:
set an operation mode of the electronic device as a sharing mode, based on a first user touch input on the first window, and
control the communication unit to transmit data to the external device, via the communication link, wherein the data is selected based on a second user touch input on the second window via the user input unit while the first window is displayed on the second window,
wherein the first window is displayed on the second window in a state of allowing a user touch input to be received in the second window.

11. The electronic device of claim 10, wherein the user input unit is configured to recognize the first user touch input on the first window for more than a predetermined time as a sharing mode request.

12. The electronic device of claim 10, wherein the controller is further configured to discontinue transmitting the data in response to a sharing mode cancel request received via the user input unit.

13. The electronic device of claim 10, wherein the controller is further configured to move the first window in response to a movement request received via the user input unit.

14. The electronic device of claim 10, wherein the controller is further configured to set the operation mode of the electronic device as a synchronization mode in response to a synchronization mode request received via the user input unit, and control the communication unit to transmit control information for controlling the external device to display content.

15. The electronic device of claim 14, wherein the control information comprises at least one from among displayed webpage link information and displayed icon position information.

16. The electronic device of claim 14, wherein the control information comprises an image of content that is displayed on the second window.

17. The electronic device of claim 14, wherein the controller is further configured to recognize an input, received via the user input unit, of dragging the first window to a side portion of a screen of the display unit, as the synchronization mode request.

18. The electronic device of claim 17, wherein the controller is further configured to change a shape of the first window to a bar shape, and display the bar-shaped first window on the side portion to indicate the synchronization mode.

19. A method of sending data from a first device to a second device, the method comprising:
displaying, on the first device, a first window corresponding to a communication application in communication with the second device, and a second window corresponding to a second application; and
in response to receiving a user input of touching the second window while the first window is displayed on the second window, transmitting data corresponding to the received user input in the second window to the second device,
wherein the first window is displayed on the second window in a state of allowing a user touch input to be received in the second window.

20. A device comprising:
a communication unit configured to communicate with a second device via a communication application;
a display unit configured to display a first window corresponding to the communication application, and a second window corresponding to a second application;
an input unit; and
a controller configured to, in response to a touch being received in the second window via the input unit while the first window is displayed on the second window, control the communication unit to transmit data corresponding to the touch received in the second window to the second device,
wherein the first window is displayed on the second window in a state of allowing a user touch input to be received in the second window.

* * * * *